US012757105B2

(12) United States Patent
Luo et al.

(10) Patent No.: US 12,757,105 B2
(45) Date of Patent: Oct. 6, 2026

(54) COMMUNICATION METHOD AND COMMUNICATIONS APPARATUS

(71) Applicant: HUAWEI TECHNOLOGIES CO., LTD., Shenzhen (CN)

(72) Inventors: Zhihu Luo, Beijing (CN); Zhe Jin, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 431 days.

(21) Appl. No.: 18/468,328

(22) Filed: Sep. 15, 2023

(65) Prior Publication Data

US 2024/0007932 A1 Jan. 4, 2024

Related U.S. Application Data

(63) Continuation of application No. PCT/CN2022/080579, filed on Mar. 14, 2022.

(30) Foreign Application Priority Data

Mar. 19, 2021 (CN) ......................... 202110296987.6

(51) Int. Cl.
*H04W 48/08* (2009.01)
*H04W 72/0446* (2023.01)
*H04W 72/0453* (2023.01)

(52) U.S. Cl.
CPC ....... *H04W 48/08* (2013.01); *H04W 72/0446* (2013.01); *H04W 72/0453* (2013.01)

(58) Field of Classification Search
CPC ................. H04L 5/0053; H04L 5/0048; H04L 5/0094; H04W 48/08; H04W 72/0453;
(Continued)

(56) References Cited

U.S. PATENT DOCUMENTS

2017/0094621 A1 3/2017 Xu et al.
2018/0270771 A1 9/2018 Chendamarai Kannan et al.
(Continued)

FOREIGN PATENT DOCUMENTS

WO 2020186946 A1 9/2020

OTHER PUBLICATIONS

3rd Generation Partnership Project; Technical Specification Group Radio Access Network; NR; Physical layer procedures for control (Release 15), 3GPP TS 38.213 V15.12.0 (Dec. 2020), total 110 pages.

(Continued)

*Primary Examiner* — Brian D Nguyen
(74) *Attorney, Agent, or Firm* — Rimon PC

(57) ABSTRACT

Embodiments of this application provide a communication method and a communications apparatus. When an operating bandwidth of a terminal device is a narrow bandwidth, time-frequency synchronization is performed on a resource with a relatively small bandwidth, to implement network communication. This avoids a communication failure and improves communication efficiency. In the method, a network device sends first indication information to a terminal device, where the first indication information indicates a relative location between a first resource and a second resource. The first resource carries a synchronization signal block and the synchronization signal block includes a first system message. The second resource carries a second system message, where a bandwidth of the second resource is less than a bandwidth of the first resource.

20 Claims, 14 Drawing Sheets

(58) Field of Classification Search
CPC ............. H04W 48/16; H04W 72/0046; H04W 4/70; Y02D 30/70
See application file for complete search history.

(56) References Cited

U.S. PATENT DOCUMENTS

| | | | | |
|---|---|---|---|---|
| 2023/0155799 | A1* | 5/2023 | Shin | H04J 11/0073 370/329 |
| 2023/0164715 | A1* | 5/2023 | Zhang | H04W 56/0015 370/350 |
| 2023/0180273 | A1* | 6/2023 | Lu | H04W 72/51 |
| 2023/0189124 | A1* | 6/2023 | Kusashima | H04L 5/0053 370/312 |
| 2023/0224125 | A1* | 7/2023 | Yuan | H04W 72/1263 370/329 |
| 2023/0292336 | A1* | 9/2023 | Liu | H04L 5/0053 |
| 2024/0049195 | A1* | 2/2024 | Shibaike | H04W 16/28 |
| 2024/0064669 | A1* | 2/2024 | Grant | H04L 5/0094 |
| 2024/0080821 | A1* | 3/2024 | Jan | H04W 48/12 |
| 2026/0020012 | A1* | 1/2026 | Li | H04W 72/12 |

OTHER PUBLICATIONS

3rd Generation Partnership Project; Technical Specification Group Radio Access Network; NR; Physical channels and modulation (Release 15), 3GPP TS 38.211 V15.8.0 (Dec. 2019), total 97 pages.

* cited by examiner

COMMUNICATION METHOD AND COMMUNICATIONS APPARATUS

CROSS-REFERENCE TO RELATED APPLICATIONS

This application is a continuation of International Application No. PCT/CN2022/080579, filed on Mar. 14, 2022, which claims priority to Chinese Patent Application No. 202110296987.6, filed on Mar. 19, 2021. The disclosures of the aforementioned applications are hereby incorporated by reference in their entireties.

TECHNICAL FIELD

This application relates to the communications field, and in particular, to a communication method and a communications apparatus.

BACKGROUND

The internet of things (IoT) extends a user end of the internet to objects for information exchange and communication. Such a communication manner is also referred to as machine type communication (MTC), and a terminal device that performs communication in an MTC system may also be referred to as an MTC terminal.

Currently, to meet requirements of low costs and low power consumption of a terminal device in a communication process of the MTC system, the terminal device may use a narrowband communication manner to support a narrower bandwidth and implement a relatively low data transmission rate. A relatively effective means of meeting these requirements is to reduce an operating bandwidth of the terminal device. This is mainly because a large bandwidth has high requirements on baseband processing of an analog-to-digital converter (ADC), a digital-to-analog converter (DAC), fast Fourier transform (FFT), a buffer, a downlink (DL)/uplink (UL) processing module, and the like, but a small bandwidth may relax these hardware requirements, so that costs are reduced.

However, a current initial access signal for accessing the network device by the terminal device is generally designed for a large bandwidth. In other words, the terminal device needs to have a capability of receiving the initial access signal in a large bandwidth frequency band. Consequently, when the operating bandwidth of the terminal device is a narrow bandwidth, the terminal device cannot use the initial access signal for communication, causing a communication failure and affecting communication efficiency.

SUMMARY

Embodiments of this application provide a communication method and a communications apparatus, so when an operating bandwidth of a terminal device is a narrow bandwidth, time-frequency synchronization is performed on a resource with a relatively small bandwidth, to implement network communication. This avoids a communication failure and improves communication efficiency.

A first aspect of the embodiments of this application provides a communication method. The method is applied to a communications apparatus. The communications apparatus may be a network device, or may be a component (for example, a processor, a chip, or a chip system) of the network device. In the method, the network device sends first indication information to a terminal device, where the first indication information indicates a relative location between a first resource and a second resource, the first resource carries a synchronization signal block, the synchronization signal block includes a first system message, the second resource carries a second system message, and a bandwidth of the second resource is less than a bandwidth of the first resource. In addition, the network device sends the synchronization signal block to the terminal device on the first resource; and the network device sends the second system message to the terminal device on the second resource.

According to the foregoing technical solution, the first resource carries the synchronization signal block including the first system message, the second resource carries the second system message, and the bandwidth of the second resource is less than the bandwidth of the first resource. Therefore, when an operating bandwidth of the terminal device is a narrowband, the second system message carried in the second resource with a relatively small bandwidth may be determined by using the first indication information. Compared with a manner in which the network device configures only an initial access signal used for a large bandwidth, this avoids a communication failure and improves communication efficiency because time-frequency synchronization may be performed on a resource with a relatively small bandwidth to implement network communication when the operating bandwidth of the terminal device is a narrow bandwidth.

It should be noted that, when the operating bandwidth of the terminal device is a large bandwidth, time-frequency synchronization may be performed based on the first indication information, to implement network communication, or time-frequency synchronization is performed through preconfiguration without depending on the first indication information, to implement network communication, or time-frequency synchronization is performed by using other information configured by the network device, without depending on the first indication information, to implement network communication. This is not limited herein.

In a possible implementation of the first aspect of the embodiments of this application, the first indication information sent by the network device indicates a relative frequency domain location between the first resource and the second resource.

According to the foregoing technical solution, the relative location indicated by the first indication information may indicate a relative location in a dimension of frequency domain. In addition to determining, through configuration or preconfiguration, the first resource carrying the synchronization signal block, the terminal device may further determine a frequency domain location of the second resource based on the relative frequency domain location between the first resource and the second resource that are indicated by the first indication information, and obtain the second system message at the frequency domain location of the second resource, so that the terminal device is prevented from performing blind detection on different frequency domain resources when the terminal device receives the second system message. This can reduce complexity of receiving the second system message by the terminal device, and can further reduce a delay and power consumption of receiving the second system message by the terminal device and improve communication efficiency.

It should be noted that a frequency domain location relationship between the first resource and the second resource may be implemented in a frequency division multiplexing (FDM) manner. In this case, the first indication information may indicate that the first resource is located at a low frequency location (adjacent to or at an interval of a frequency) of the second resource in frequency domain, or may indicate that the first resource is located at a high frequency location (adjacent to or at an interval of a frequency) of the second resource in frequency domain. Alternatively, the frequency domain location relationship between the first resource and the second resource may not be implemented in the FDM manner. In this case, the first indication information may indicate that the first resource and the second resource are located at a same frequency domain location in frequency domain, or may indicate that the first resource and the second resource have at least partially the same frequency domain location in frequency domain. This is not limited herein.

In a possible implementation of the first aspect of the embodiments of this application, when a signal sequence that carries the first indication information is a first sequence, the first indication information indicates that the first resource is located at a low frequency location (adjacent to or at an interval of a frequency) of the second resource in frequency domain; and when the signal sequence that carries the first indication information is a second sequence, the first indication information indicates that the first resource is located at a high frequency location (adjacent to or at an interval of a frequency) of the second resource in frequency domain, where the first sequence is different from the second sequence.

It should be noted that the first sequence or the second sequence may be one of a ZC sequence, a Gold sequence, a Frank sequence, a Golay complementary sequence, an m sequence, an M sequence, a Hadamard sequence, and a Walsh sequence, or may be a product of two or more of the foregoing sequences, or may be a sequence of another type. This is not limited herein.

According to the foregoing technical solution, when the first indication information indicates the relative location between the first resource and the second resource in a dimension of frequency domain, the first indication information may carry different sequences to indicate the relative location. For example, the first sequence indicates that the first resource is located at the low frequency location (adjacent to or at an interval of a frequency) of the second resource in frequency domain, and the second sequence different from the first sequence indicates that the first resource is located at the high frequency location (adjacent to or at an interval of a frequency) of the second resource in frequency domain.

In a possible implementation of the first aspect of the embodiments of this application, in time domain, the second resource is a subset of the first resource; or in time domain, the second resource is a subset of a sum of the first resource and a time domain resource that carries the first indication information.

Optionally, in time domain, the first resource is a subset of the second resource.

According to the foregoing technical solution, the first resource and the second resource may be implemented in an FDM manner, that is, in time domain, the second resource is the subset of the first resource; or a sum of the first resource, the second resource, and the time domain resource that carries the first indication is implemented in an FDM manner, that is, in time domain, the second resource is the subset of the sum of the first resource and the time domain resource that carries the first indication information. Therefore, compared with a manner in which the network device sends different signals on different time domain resources, a manner in which the network device sends different signals on a same time domain resource or some same time domain resources in an FDM manner can save energy consumption of the network device.

In a possible implementation of the first aspect of the embodiments of this application, the first indication information indicates a relative time domain location between the first resource and the second resource.

According to the foregoing technical solution, the relative location indicated by the first indication information may indicate a relative location in a dimension of time domain. In addition to determining, through configuration or preconfiguration, the first resource carrying the synchronization signal block, the terminal device may further determine a time domain location of the second resource based on the relative time domain location between the first resource and the second resource that are indicated by the first indication information, and obtain the second system message at the time domain location of the second resource, so that the terminal device is prevented from performing blind detection on different time domain resources when the terminal device receives the second system message. This can reduce complexity of receiving the second system message by the terminal device, and can further reduce a delay and power consumption of receiving the second system message by the terminal device and improve communication efficiency.

It should be noted that a time domain location relationship between the first resource and the second resource may be implemented in a time division multiplexing (TDM) manner. In this case, in time domain, the first resource and the second resource are adjacent or are spaced by a quantity of orthogonal frequency division multiplexing (OFDM) symbols, and the first indication information may indicate that a time domain location of the first resource is located after the time domain location of the second resource, or may indicate that the time domain location of the first resource is located before the time domain location of the second resource. Alternatively, the time domain location relationship between the first resource and the second resource may not be implemented in the TDM manner. In this case, the first indication information may indicate that the time domain location of the first resource is the same as the time domain location of the second resource, or may indicate that the time domain location of the first resource is at least partially the same as the time domain location of the second resource. This is not limited herein.

Optionally, when the signal sequence that carries the first indication information is a third sequence, the first indication information indicates that the time domain location of the first resource is located after the time domain location of the second resource; and when the signal sequence that carries the first indication information is a fourth sequence, the first indication information indicates that the time domain location of the first resource is located before the frequency domain location of the second resource, where the third sequence is different from the fourth sequence.

Optionally, the third sequence is the same as the first sequence, and the fourth sequence is the same as the second sequence. For example, the first indication information indicates the relative location between the first resource and the second resource in two dimensions: frequency domain and time domain. In this case, the first indication information indicates that the time domain location of the first resource is located after the time domain location of the second resource, and the first resource is located at a low frequency location (adjacent to or at an interval of a frequency) of the second resource in frequency domain; or the first indication information indicates that the time domain location of the first resource is located before the frequency domain location of the second resource, and the first resource is located at a high frequency location (adjacent to or at an interval of a frequency) of the second resource in frequency domain.

Optionally, the third sequence is the same as the second sequence, and the fourth sequence is the same as the first sequence. For example, the first indication information indicates the relative location between the first resource and the second resource in two dimensions: frequency domain and time domain. In this case, the first indication information may indicate that the time domain location of the first resource is located after the time domain location of the second resource, and the first resource is located at a high frequency location (adjacent to or at an interval of a frequency) of the second resource in frequency domain; or the first indication information indicates that the time domain location of the first resource is located before the frequency domain location of the second resource, and the first resource is located at a low frequency location (adjacent to or at an interval of a frequency) of the second resource in frequency domain.

In a possible implementation of the first aspect of the embodiments of this application, in frequency domain, the second resource is a subset of the first resource.

According to the foregoing technical solution, the first resource and the second resource may be implemented in a TDM manner. For example, in frequency domain, the second resource is the subset of the first resource, and in time domain, the first resource and the second resource are adjacent or are spaced by a quantity of OFDM symbols. In this way, when the bandwidth of the terminal device is a narrowband, the terminal device receives different signals on a same frequency domain resource or some same frequency domain resources in a TDM manner. Compared with a manner in which the terminal device receives different signals on different frequency domain resources through radio frequency (RF) switching, this helps the narrowband terminal device quickly receive different signals, and saves energy consumption of the terminal device.

In a possible implementation of the first aspect of the embodiments of this application, in frequency domain, the bandwidth of the second resource is greater than or equal to a bandwidth of a third resource, where the third resource carries a primary synchronization signal or a secondary synchronization signal in the synchronization signal block.

According to the foregoing technical solution, a bandwidth of each of the primary synchronization signal and the secondary synchronization signal in the synchronization signal block carried in the first resource is less than the bandwidth of the first resource. When the operating bandwidth of the terminal device is a narrowband, after receiving the second system message, the terminal device may perform, by using the second system message, complete time-frequency synchronization with reference to the primary synchronization signal and the secondary synchronization signal carried in the third resource. In this way, terminal devices with different operating bandwidths can reuse the primary synchronization signal and the secondary synchronization signal in the synchronization signal block carried in the first resource. Compared with a manner in which the network device separately configures the primary synchronization signal and the secondary synchronization signal for the terminal devices with different operating bandwidths, this can reduce signaling consumption of the network device.

In a possible implementation of the first aspect of the embodiments of this application, the time domain location for carrying the first indication information is located after a time domain location of the first resource, or the time domain location for carrying the first indication information is located before the time domain location of the first resource.

According to the foregoing technical solution, when the time domain location for carrying the first indication information is located before the time domain location of the first resource, after the terminal device obtains time-frequency synchronization on the first resource based on the synchronization signal block, the terminal device may receive and detect the first indication information as soon as possible. This reduces a delay of obtaining the first indication information, and further reduces a delay of obtaining the second system message. When the time domain location for carrying the first indication information is located after the time domain location of the first resource, a probability of a conflict between the first indication information and a control signal can be reduced, so that detection performance of the first indication information is ensured.

Optionally, the time domain location for carrying the first indication information is a subset of the time domain location of the first resource. In other words, a resource multiplexing relationship between the time domain resource that carries the first indication information and the first resource is TDM.

According to the foregoing technical solution, there may be an association relationship between the time domain location of the first resource and the time domain location for carrying the first indication information. For example, in time domain, the first resource and the time domain resource that carries the first indication information are adjacent or are spaced by a quantity of OFDM symbols. In this way, the terminal device determines the time domain location of the first resource through configuration or preconfiguration, and further receives the first indication information after (or before) the time domain location of the first resource, so that the terminal device is prevented from performing blind detection on different time domain resources when the terminal device receives the first indication information. This can reduce complexity of receiving the first indication information by the terminal device, and can further reduce a delay and power consumption of receiving the first indication information by the terminal device and improve communication efficiency.

In a possible implementation of the first aspect of the embodiments of this application, the first indication information and the synchronization signal block are located in a same slot.

According to the foregoing technical solution, an elementary time unit for downlink resource scheduling in a communications system is generally one slot, and the network device may perform scheduling by adding the first indication information and the synchronization signal block to a same slot. Compared with a manner in which different signals are carried in different slots, this can reduce complexity of performing downlink scheduling by the network device.

In a possible implementation of the first aspect of the embodiments of this application, a transmit beam of the first indication information is the same as a transmit beam of the synchronization signal block.

According to the foregoing technical solution, the network device sends the first indication information and the synchronization signal block by using a same transmit beam, so that channel information is obtained based on the synchronization signal block, and is applied to detection of the first indication information. This improves detection performance of the first indication information.

In a possible implementation of the first aspect of the embodiments of this application, the first indication information is carried in downlink control information (DCI), a cyclic redundancy check (CRC) corresponding to the DCI is scrambled by using a first identifier, and the first identifier is a preset value, or the first identifier is determined based on a cell identity corresponding to the synchronization signal block.

It should be noted that the first identifier may include one or more of a radio network temporary identifier (RNTI), a group radio network temporary identifier (G-RNTI), a cell RNTI (C-RNTI), or another identifier. This is not limited herein.

According to the foregoing technical solution, the first indication information may carry information by using one or more bits. For example, the first indication information may carry information by using a field in the DCI. This provides an example implementation in which the first indication information carries information.

In a possible implementation of the first aspect of the embodiments of this application, the first indication information further indicates that the second system message is sent.

According to the foregoing technical solution, in addition to indicating the relative location between the first resource and the second resource, the first indication information may further indicate that the second system message is sent by the network device. When the time domain location for carrying the first indication information is located before the second resource, the first indication information may indicate that the second system message is to be sent by the network device. When the time domain location for carrying the first indication information is in the second time domain, the first indication information may indicate that the second system message is to be sent by the network device.

In a possible implementation of the first aspect of the embodiments of this application, the time domain resource occupied by the first indication information is one or more OFDM symbols in a first slot, where the time domain resource occupied by the first indication information is located after a time domain resource occupied by the last synchronization signal block in the first slot; or the time domain resource occupied by the first indication information is located after a time domain resource occupied by the synchronization signal block in the first slot.

According to the foregoing technical solution, an elementary time unit for downlink resource scheduling in a communications system is generally one slot, one slot includes a plurality of OFDM symbols, and the first indication information may be scheduled based on a slot. Further, the first indication information and the synchronization signal block may be placed in a same slot for scheduling, and the first indication information may be carried, in different manners, between different synchronization signal blocks included in a same slot.

In a possible implementation of the first aspect of the embodiments of this application, the first indication information further indicates whether the terminal device listens to one or more paging occasions (PO) located after the time domain location of the first indication information.

According to the foregoing technical solution, in addition to indicating the relative location between the first resource and the second resource, the first indication information may be further used by the terminal device to determine whether to listen to the one or more POs located after the first indication information. Compared with a manner in which the terminal device blindly listens to a PO, this can avoid a waste of power consumption caused when blind detection performed by the terminal device fails.

In a possible implementation of the first aspect of the embodiments of this application, the first indication information further indicates whether a third system message of the terminal device is updated.

Optionally, the third system message includes at least one of the second system message and the first system message.

Optionally, the third system message is different from the second system message, and the third system message is different from the first system message.

According to the foregoing technical solution, in addition to indicating the relative location between the first resource and the second resource, the first indication information may further indicate whether the third system message of the terminal device is updated, and the system information is read only when the system information needs to be updated, so that unnecessary system information reading is reduced and power consumption of the terminal device is reduced.

In a possible implementation of the first aspect of the embodiments of this application, the first indication information further indicates whether the terminal device is allowed to select, during cell selection/reselection, a cell that has a same frequency as a barred cell.

According to the foregoing technical solution, in addition to indicating the relative location between the first resource and the second resource, the first indication information may further indicate whether the terminal device is allowed to select, during cell selection/reselection, the cell that has the same frequency as the barred cell. Therefore, a quantity of cells selected/reselected by the terminal device can be reduced by using the first indication information, so that power consumption of the terminal device is reduced.

In a possible implementation of the first aspect of the embodiments of this application, the first indication information further indicates whether a cell corresponding to the synchronization signal block is a barred cell.

According to the foregoing technical solution, in addition to indicating the relative location between the first resource and the second resource, the first indication information may further indicate whether the cell corresponding to the synchronization signal block is the barred cell. The first indication information may be applied to a scenario in which the narrowband terminal is temporarily prevented from accessing a cell during maintenance, and signaling should be notified at an earlier time. In this way, the terminal device can learn as early as possible whether the terminal device is allowed to access the cell corresponding to the synchronization signal block, so as to avoid unnecessary receiving.

In a possible implementation of the first aspect of the embodiments of this application, the first indication information further indicates whether the synchronization signal block includes a system information block 1 (SIB1).

According to the foregoing technical solution, in addition to indicating the relative location between the first resource and the second resource, the first indication information may further indicate whether the synchronization signal block includes the SIB1. When the synchronization signal block includes the SIB1, the synchronization signal block is a cell defining synchronization broadcast signal block (CD-SBB). When the synchronization signal block does not include the SIB1, the synchronization signal block is a non cell defining synchronization broadcast signal block (non CD-SSB). The non CD-SSB is generally used for measurement instead of initial access. If the terminal device determines, in an initial access process by using the first indication, that the synchronization signal block carried in the first resource is the non CD-SSB, the narrowband terminal may not receive the second system message at a frequency corresponding to the synchronization signal block. This reduces power consumption.

In a possible implementation of the first aspect of the embodiments of this application, the first indication information further indicates that a resource multiplexing manner for the first resource and the second resource is TDM or FDM.

According to the foregoing technical solution, in addition to indicating the relative location between the first resource and the second resource, the first indication information may further indicate that the first resource and the second resource use the TDM multiplexing manner, or indicate that the first resource and the second resource use the FDM multiplexing manner. FDM helps the network device achieve an energy saving effect, TDM helps the terminal device quickly receive a signal, and both have advantages. The indication of the first indication information may make implementation of the network device more flexible.

In a possible implementation of the first aspect of the embodiments of this application, the first indication information is further used for radio resource management (RRM) measurement.

According to the foregoing technical solution, in addition to indicating the relative location between the first resource and the second resource, the first indication information may be further used for RRM measurement, so that the terminal device can improve, based on the first indication information, RRM measurement precision with reference to the synchronization signal block.

In a possible implementation of the first aspect of the embodiments of this application, the first indication information further indicates a radio frame number of the first indication information or N least significant bits of the radio frame number, where N is a positive integer.

According to the foregoing technical solution, in addition to indicating the relative location between the first resource and the second resource, the first indication information may further indicate the radio frame number of the first indication information or the N least significant bits of the radio frame number. The terminal device may obtain the radio frame number or the N least significant bits of the radio frame number by using the first indication information. This can reduce descrambling and/or decoding of the second system message, reduce complexity, and further reduce costs of the terminal device.

In a possible implementation of the first aspect of the embodiments of this application, the first system message is a first master information block (MIB) carried on a first physical broadcast channel (PBCH), and the second system message is a second MIB carried on a second PBCH.

According to the foregoing technical solution, the first system message may be the first MIB carried on the PBCH in the synchronization signal block, and the second system message may be the second MIB carried on the second PBCH, where the first PBCH is different from the second PBCH.

In a possible implementation of the first aspect of the embodiments of this application, the first MIB is the same as the second MIB.

According to the foregoing technical solution, because the first MIB and the second MIB are respectively used for terminal devices with different operating bandwidths, and the first MIB may be the same as the second MIB, the network device configures a same MIB for the terminal devices with different operating bandwidths. Compared with a manner in which the network device configures different MIBs for the terminal devices with different operating bandwidths, this can reduce signaling consumption of the network device.

Optionally, the first MIB is different from the second MIB.

Optionally, bit information corresponding to the second MIB is a subset of bit information corresponding to the first MIB.

In a possible implementation of the first aspect of the embodiments of this application, a first complex symbol obtained after modulation and encoding of the first MIB is mapped to the first resource, a second complex symbol obtained after modulation and encoding of the second MIB is mapped to the second resource, and the second complex symbol is a subset of the first complex symbol.

According to the foregoing technical solution, the first MIB may be different from the second MIB. Because the first MIB is used for the network device with a relatively large operating bandwidth, the second MIB is used for the terminal device with a relatively small operating bandwidth, and the terminal device with a relatively small operating bandwidth usually requires a relatively small amount of configuration information data, the second MIB may reuse a part of the first MIB. There may be different MIB forms during signal transmission and processing. When an MIB is described from a dimension of a modulation symbol, the second complex symbol obtained after modulation and encoding of the second MIB is the subset of the first complex symbol obtained after modulation and encoding of the first MIB. When an MIB is described from a dimension of bit information, the bit information corresponding to the second MIB is the subset of the bit information corresponding to the first MIB.

A second aspect of the embodiments of this application provides a communication method. The method is applied to a communications apparatus. The communications apparatus may be a terminal device, or may be a component (for example, a processor, a chip, or a chip system) of the terminal device. In the method, the terminal device receives first indication information from a network device, where the first indication information indicates a relative location between a first resource and a second resource, the first resource carries a synchronization signal block, the synchronization signal block includes a first system message, the second resource carries a second system message, and a bandwidth of the second resource is less than a bandwidth of the first resource. Then, the terminal device receives the second system message from the network device on the second resource.

According to the foregoing technical solution, the first resource carries the synchronization signal block including the first system message, the second resource carries the second system message, and the bandwidth of the second resource is less than the bandwidth of the first resource. Therefore, when an operating bandwidth of the terminal device is a narrowband, the second system message carried in the second resource with a relatively small bandwidth may be determined by using the first indication information. Compared with a manner in which the network device configures only an initial access signal used for a large bandwidth, this avoids a communication failure and improves communication efficiency because time-frequency synchronization may be performed on a resource with a relatively small bandwidth to implement network communication when the operating bandwidth of the terminal device is a narrow bandwidth.

It should be noted that, when the operating bandwidth of the terminal device is a large bandwidth, time-frequency synchronization may be performed based on the first indication information, to implement network communication, or time-frequency synchronization is performed through preconfiguration without depending on the first indication information, to implement network communication, or time-frequency synchronization is performed by using other information configured by the network device, without depending on the first indication information, to implement network communication. This is not limited herein.

In a possible implementation of the second aspect of the embodiments of this application, the first indication information sent by the network device indicates a relative frequency domain location between the first resource and the second resource.

According to the foregoing technical solution, the relative location indicated by the first indication information may indicate a relative location in a dimension of frequency domain. In addition to determining, through configuration or preconfiguration, the first resource carrying the synchronization signal block, the terminal device may further determine a frequency domain location of the second resource based on the relative frequency domain location between the first resource and the second resource that are indicated by the first indication information, and obtain the second system message at the frequency domain location of the second resource, so that the terminal device is prevented from performing blind detection on different frequency domain resources when the terminal device receives the second system message. This can reduce complexity of receiving the second system message by the terminal device, and can further reduce a delay and power consumption of receiving the second system message by the terminal device and improve communication efficiency.

It should be noted that a frequency domain location relationship between the first resource and the second resource may be implemented in a frequency division multiplexing (FDM) manner. In this case, the first indication information may indicate that the first resource is located at a low frequency location (adjacent to or at an interval of a frequency) of the second resource in frequency domain, or may indicate that the first resource is located at a high frequency location (adjacent to or at an interval of a frequency) of the second resource in frequency domain. In addition, the frequency domain location relationship between the first resource and the second resource may not be implemented in the FDM manner. In this case, the first indication information may indicate that the first resource and the second resource are located at a same frequency domain location in frequency domain, or may indicate that the first resource and the second resource have at least partially the same frequency domain location in frequency domain. This is not limited herein.

In a possible implementation of the second aspect of the embodiments of this application, when a signal sequence that carries the first indication information is a first sequence, the first indication information indicates that the first resource is located at a low frequency location (adjacent to or at an interval of a frequency) of the second resource in frequency domain; and when the signal sequence that carries the first indication information is a second sequence, the first indication information indicates that the first resource is located at a high frequency location (adjacent to or at an interval of a frequency) of the second resource in frequency domain, where the first sequence is different from the second sequence.

It should be noted that the first sequence or the second sequence may be one of a ZC sequence, a Gold sequence, a Frank sequence, a Golay complementary sequence, an m sequence, an M sequence, a Hadamard sequence, and a Walsh sequence, or may be a product of two or more of the foregoing sequences, or may be a sequence of another type. This is not limited herein.

According to the foregoing technical solution, when the first indication information indicates the relative location between the first resource and the second resource in a dimension of frequency domain, the first indication information may carry different sequences to indicate the relative location. For example, the first sequence indicates that the first resource is located at the low frequency location (adjacent to or at an interval of a frequency) of the second resource in frequency domain, and the second sequence different from the first sequence indicates that the first resource is located at the high frequency location (adjacent to or at an interval of a frequency) of the second resource in frequency domain.

In a possible implementation of the second aspect of the embodiments of this application, in time domain, the second resource is a subset of the first resource; or in time domain, the second resource is a subset of a sum of the first resource and a time domain resource that carries the first indication information.

Optionally, in time domain, the first resource is a subset of the second resource.

According to the foregoing technical solution, the first resource and the second resource may be implemented in an FDM manner, that is, in time domain, the second resource is the subset of the first resource; or a sum of the first resource, the second resource, and the time domain resource that carries the first indication is implemented in an FDM manner, that is, in time domain, the second resource is the subset of the sum of the first resource and the time domain resource that carries the first indication information. Therefore, compared with a manner in which the network device sends different signals on different time domain resources, a manner in which the network device sends different signals on a same time domain resource or some same time domain resources in an FDM manner can save energy consumption of the network device.

In a possible implementation of the second aspect of the embodiments of this application, the first indication information indicates a relative time domain location between the first resource and the second resource.

According to the foregoing technical solution, the relative location indicated by the first indication information may indicate a relative location in a dimension of time domain. In addition to determining, through configuration or preconfiguration, the first resource carrying the synchronization signal block, the terminal device may further determine a time domain location of the second resource based on the relative time domain location between the first resource and the second resource that are indicated by the first indication information, and obtain the second system message at the time domain location of the second resource, so that the terminal device is prevented from performing blind detection on different time domain resources when the terminal device receives the second system message. This can reduce complexity of receiving the second system message by the terminal device, and can further reduce a delay and power consumption of receiving the second system message by the terminal device and improve communication efficiency.

It should be noted that a time domain location relationship between the first resource and the second resource may be implemented in a TDM manner. In this case, in time domain, the first resource and the second resource are adjacent or are spaced by a quantity of OFDM symbols, and the first indication information may indicate that the time domain location of the first resource is located after the time domain location of the second resource, or may indicate that the time domain location of the first resource is located before the frequency domain location of the second resource. In addition, the time domain location relationship between the first resource and the second resource may not be implemented in the TDM manner. In this case, the first indication information may indicate that the time domain location of the first resource is the same as the time domain location of the second resource, or may indicate that the time domain location of the first resource is at least partially the same as the time domain location of the second resource. This is not limited herein.

Optionally, when the signal sequence that carries the first indication information is a third sequence, the first indication information indicates that the time domain location of the first resource is located after the time domain location of the second resource; and when the signal sequence that carries the first indication information is a fourth sequence, the first indication information indicates that the time domain location of the first resource is located before the frequency domain location of the second resource, where the third sequence is different from the fourth sequence.

Optionally, the third sequence is the same as the first sequence, and the fourth sequence is the same as the second sequence. For example, the first indication information indicates the relative location between the first resource and the second resource in two dimensions: frequency domain and time domain. In this case, the first indication information may indicate that the time domain location of the first resource is located after the time domain location of the second resource, and the first resource may be located at a low frequency location (adjacent to or at an interval of a frequency) of the second resource in frequency domain; or the first indication information may indicate that the time domain location of the first resource is located before the frequency domain location of the second resource, and the first resource may be located at a high frequency location (adjacent to or at an interval of a frequency) of the second resource in frequency domain.

Optionally, the third sequence is the same as the second sequence, and the fourth sequence is the same as the first sequence. For example, the first indication information indicates the relative location between the first resource and the second resource in two dimensions: frequency domain and time domain. In this case, the first indication information may indicate that the time domain location of the first resource is located after the time domain location of the second resource, and the first resource may be located at a high frequency location (adjacent to or at an interval of a frequency) of the second resource in frequency domain; or the first indication information may indicate that the time domain location of the first resource is located before the frequency domain location of the second resource, and the first resource may be located at a low frequency location (adjacent to or at an interval of a frequency) of the second resource in frequency domain.

In a possible implementation of the second aspect of the embodiments of this application, in frequency domain, the second resource is a subset of the first resource.

According to the foregoing technical solution, the first resource and the second resource may be implemented in a TDM manner. For example, in frequency domain, the second resource is the subset of the first resource. In this way, when the bandwidth of the terminal device is a narrowband, the terminal device receives different signals on a same frequency domain resource or some same frequency domain resources in a TDM manner. Compared with a manner in which the terminal device receives different signals on different frequency domain resources through RF switching, this helps the narrowband terminal device quickly receive different signals, and saves energy consumption of the terminal device.

In a possible implementation of the second aspect of the embodiments of this application, in frequency domain, the bandwidth of the second resource is greater than or equal to a bandwidth of a third resource, where the third resource carries a primary synchronization signal or a secondary synchronization signal in the synchronization signal block.

According to the foregoing technical solution, a bandwidth of each of the primary synchronization signal and the secondary synchronization signal in the synchronization signal block carried in the first resource is less than the bandwidth of the first resource. When the operating bandwidth of the terminal device is a narrowband, after receiving the second system message, the terminal device may perform, by using the second system message, complete time-frequency synchronization with reference to the primary synchronization signal and the secondary synchronization signal carried in the third resource. In this way, terminal devices with different operating bandwidths can reuse the primary synchronization signal and the secondary synchronization signal in the synchronization signal block carried in the first resource. Compared with a manner in which the network device separately configures the primary synchronization signal and the secondary synchronization signal for the terminal devices with different operating bandwidths, this can reduce signaling consumption of the network device.

In a possible implementation of the second aspect of the embodiments of this application, the time domain location for carrying the first indication information is located after a time domain location of the first resource, or the time domain location for carrying the first indication information is located before the time domain location of the first resource.

According to the foregoing technical solution, when the time domain location for carrying the first indication information is located before the time domain location of the first resource, after the terminal device obtains time-frequency synchronization on the first resource based on the synchronization signal block, the terminal device may receive and detect the first indication information as soon as possible. This reduces a delay of obtaining the first indication information, and further reduces a delay of obtaining the second system message. When the time domain location for carrying the first indication information is located after the time domain location of the first resource, a probability of a conflict between the first indication information and a control signal can be reduced, so that detection performance of the first indication information is ensured.

According to the foregoing technical solution, there may be an association relationship between the time domain location of the first resource and the time domain location for carrying the first indication information. For example, in time domain, the first resource and the time domain resource that carries the first indication information are adjacent or are spaced by a quantity of OFDM symbols. In this way, the terminal device determines the time domain location of the first resource through configuration or preconfiguration, and further receives the first indication information after (or before) the time domain location of the first resource, so that the terminal device is prevented from performing blind detection on different time domain resources when the terminal device receives the first indication information. This can reduce complexity of receiving the first indication information by the terminal device, and can further reduce a delay and power consumption of receiving the first indication information by the terminal device and improve communication efficiency.

In a possible implementation of the second aspect of the embodiments of this application, the first indication information and the synchronization signal block are located in a same slot.

According to the foregoing technical solution, an elementary time unit for downlink resource scheduling in a communications system is generally one slot, and the network device may perform scheduling by adding the first indication information and the synchronization signal block to a same slot. Compared with a manner in which different signals are separately carried in different slots, this can reduce complexity of performing downlink scheduling by the network device.

In a possible implementation of the second aspect of the embodiments of this application, a transmit beam of the first indication information is the same as a transmit beam of the synchronization signal block.

According to the foregoing technical solution, the network device sends the first indication information and the synchronization signal block by using a same transmit beam, so that channel information is obtained based on the synchronization signal block, and is applied to detection of the first indication information. This improves detection performance of the first indication information.

In a possible implementation of the second aspect of the embodiments of this application, the method further includes: The terminal device receives a first part of the synchronization signal block; and the terminal device determines, based on the first part of the synchronization signal block, a time domain location for carrying the first indication information.

According to the foregoing technical solution, when the operating bandwidth of the terminal device is a narrowband, the terminal device may receive the first part of the synchronization signal block based on a relatively small bandwidth, and determine, based on the first part, the time domain location for carrying the first indication information. The first part of the synchronization signal may include a demodulation reference signal (DMRS) used to determine an index of the synchronization signal block, or another signal used to determine the index of the synchronization signal block. This is not limited herein.

In a possible implementation of the second aspect of the embodiments of this application, the first indication information is carried in DCI, a CRC corresponding to the DCI is scrambled by using a first identifier, and the first identifier is a preset value, or the first identifier is determined based on a cell identity corresponding to the synchronization signal block.

It should be noted that the first identifier may include one or more of an RNTI, a G-RNTI, a C-RNTI, or another identifier. This is not limited herein.

According to the foregoing technical solution, the first indication information may carry information by using one or more bits. For example, the first indication information may carry information by using a field in the DCI. This provides an implementation in which the first indication information carries information.

In a possible implementation of the second aspect of the embodiments of this application, the first indication information further indicates that the second system message is sent.

According to the foregoing technical solution, in addition to indicating the relative location between the first resource and the second resource, the first indication information may further indicate that the second system message is sent by the network device. When the time domain location for carrying the first indication information is located before the second resource, the first indication information may indicate that the second system message is to be sent by the network device. When the time domain location for carrying the first indication information is in the second time domain, the first indication information may indicate that the second system message is to be sent by the network device.

In a possible implementation of the second aspect of the embodiments of this application, the time domain resource occupied by the first indication information is one or more OFDM symbols in a first slot, where the time domain resource occupied by the first indication information is located after a time domain resource occupied by the last synchronization signal block in the first slot; or the time domain resource occupied by the first indication information is located after a time domain resource occupied by the synchronization signal block in the first slot.

According to the foregoing technical solution, an elementary time unit for downlink resource scheduling in a communications system is generally one slot, one slot includes a plurality of OFDM symbols, and the first indication information may be scheduled based on a slot. Further, the first indication information and the synchronization signal block may be placed in a same slot for scheduling, and the first indication information may be carried, in different manners, between different synchronization signal blocks included in a same slot.

In a possible implementation of the second aspect of the embodiments of this application, the first indication information further indicates whether the terminal device listens to one or more paging occasions POs located after the time domain location of the first indication information.

According to the foregoing technical solution, in addition to indicating the relative location between the first resource and the second resource, the first indication information may be further used by the terminal device to determine whether to listen to the one or more POs located after the first indication information. Compared with a manner in which the terminal device blindly listens to a PO, this can avoid a waste of power consumption caused when blind detection performed by the terminal device fails.

In a possible implementation of the second aspect of the embodiments of this application, the first indication information further indicates whether a third system message of the terminal device is updated.

Optionally, the third system message includes at least one of the second system message and the first system message.

Optionally, the third system message is different from the second system message, and the third system message is different from the first system message.

According to the foregoing technical solution, in addition to indicating the relative location between the first resource and the second resource, the first indication information may further indicate whether the third system message of the terminal device is updated, and system information is read only when the system information needs to be updated. This reduces unnecessary system information reading and reduces power consumption of the terminal device.

In a possible implementation of the second aspect of the embodiments of this application, the first indication information further indicates whether the terminal device is allowed to select, during cell selection/reselection, a cell that has a same frequency as a barred cell.

According to the foregoing technical solution, in addition to indicating the relative location between the first resource and the second resource, the first indication information may further indicate whether the terminal device is allowed to select, during cell selection/reselection, the cell that has the same frequency as the barred cell. Therefore, a quantity of cells selected/reselected by the terminal device can be reduced by using the first indication information, so that power consumption of the terminal device is reduced.

In a possible implementation of the second aspect of the embodiments of this application, the first indication information further indicates whether a cell corresponding to the synchronization signal block is a barred cell.

According to the foregoing technical solution, in addition to indicating the relative location between the first resource and the second resource, the first indication information may further indicate whether the cell corresponding to the synchronization signal block is the barred cell. The first indication information may be applied to a scenario in which the narrowband terminal is temporarily prevented from accessing a cell during maintenance, and signaling should be notified at an earlier time. In this way, the terminal device can learn as early as possible whether the terminal device is allowed to access the cell corresponding to the synchronization signal block, so as to avoid unnecessary receiving.

In a possible implementation of the second aspect of the embodiments of this application, the first indication information further indicates whether the synchronization signal block includes a system information block 1 (SIB1).

According to the foregoing technical solution, in addition to indicating the relative location between the first resource and the second resource, the first indication information may further indicate whether the synchronization signal block includes the SIB1. When the synchronization signal block includes the SIB1, the synchronization signal block is a cell defining synchronization broadcast signal block (CD-SBB). When the synchronization signal block does not include the SIB1, the synchronization signal block is a non cell defining synchronization broadcast signal block (non CD-SSB). The non CD-SSB is generally used for measurement instead of initial access. If the terminal device determines, in an initial access process by using the first indication, that the synchronization signal block carried in the first resource is the non CD-SSB, the narrowband terminal may not receive the second system message at a frequency corresponding to the synchronization signal block. This reduces power consumption.

In a possible implementation of the second aspect of the embodiments of this application, the first indication information further indicates that a resource multiplexing manner for the first resource and the second resource is TDM or FDM.

According to the foregoing technical solution, in addition to indicating the relative location between the first resource and the second resource, the first indication information may further indicate that the first resource and the second resource use the TDM multiplexing manner, or indicate that the first resource and the second resource use the FDM multiplexing manner. FDM helps the network device achieve an energy saving effect, TDM helps the terminal device quickly receive a signal, and both have advantages. The indication of the first indication information may make implementation of the network device more flexible.

In a possible implementation of the second aspect of the embodiments of this application, the first indication information is further used for RRM measurement.

According to the foregoing technical solution, in addition to indicating the relative location between the first resource and the second resource, the first indication information may be further used for RRM measurement, so that the terminal device can improve, based on the first indication information, RRM measurement precision with reference to the synchronization signal block.

In a possible implementation of the second aspect of the embodiments of this application, the first indication information further indicates a radio frame number of the first indication information or N least significant bits of the radio frame number, where N is a positive integer.

According to the foregoing technical solution, in addition to indicating the relative location between the first resource and the second resource, the first indication information may further indicate the radio frame number of the first indication information or the N least significant bits of the radio frame number. The terminal device may obtain the radio frame number or the N least significant bits of the radio frame number by using the first indication information. This can reduce descrambling and/or decoding of the second system message, reduce complexity, and further reduce costs of the terminal device.

In a possible implementation of the second aspect of the embodiments of this application, the first system message is a first MIB carried on a first PBCH, and the second system message is a second MIB carried on a second PBCH.

According to the foregoing technical solution, the first system message may be the first MIB carried on the PBCH in the synchronization signal block, and the second system message may be the second MIB carried on the second PBCH, where the first PBCH is different from the second PBCH.

In a possible implementation of the second aspect of the embodiments of this application, the first MIB is the same as the second MIB.

According to the foregoing technical solution, because the first MIB and the second MIB are respectively used for terminal devices with different operating bandwidths, and the first MIB may be the same as the second MIB, the network device configures a same MIB for the terminal devices with different operating bandwidths. Compared with a manner in which the network device configures different MIBs for the terminal devices with different operating bandwidths, this can reduce signaling consumption of the network device.

Optionally, the first MIB is different from the second MIB.

Optionally, bit information corresponding to the second MIB is a subset of bit information corresponding to the first MIB.

In a possible implementation of the second aspect of the embodiments of this application, a first complex symbol obtained after modulation and encoding of the first MIB is mapped to the first resource, a second complex symbol obtained after modulation and encoding of the second MIB is mapped to the second resource, and the second complex symbol is a subset of the first complex symbol.

According to the foregoing technical solution, the first MIB may be different from the second MIB. Because the first MIB is used for the network device with a relatively large operating bandwidth, the second MIB is used for the terminal device with a relatively small operating bandwidth, and the terminal device with a relatively small operating bandwidth usually requires a relatively small amount of configuration information data, the second MIB may reuse a part of the first MIB. There may be different MIB forms during signal transmission and processing. When an MIB is described from a dimension of a modulation symbol, the second complex symbol obtained after modulation and encoding of the second MIB is the subset of the first complex symbol obtained after modulation and encoding of the first MIB. When an MIB is described from a dimension of bit information, the bit information corresponding to the second MIB is the subset of the bit information corresponding to the first MIB.

A third aspect of the embodiments of this application provides a communications apparatus, including a processing unit and a transceiver unit.

The processing unit is configured to generate first indication information, where the first indication information indicates a relative location between a first resource and a second resource, the first resource carries a synchronization signal block, the synchronization signal block includes a first system message, the second resource carries a second system message, and a bandwidth of the second resource is less than a bandwidth of the first resource.

The transceiver unit is configured to send the first indication information.

The transceiver unit is further configured to send the synchronization signal block to a terminal device on the first resource.

The transceiver unit is further configured to send the second system message to the terminal device on the second resource.

In a possible implementation of the third aspect of the embodiments of this application, the first indication information indicates a relative frequency domain location between the first resource and the second resource.

In a possible implementation of the third aspect of the embodiments of this application, when a signal sequence that carries the first indication information is a first sequence, the first indication information indicates that the first resource is located at a low frequency location of the second resource in frequency domain; and when the signal sequence that carries the first indication information is a second sequence, the first indication information indicates that the first resource is located at a high frequency location of the second resource in frequency domain, where the first sequence is different from the second sequence.

In a possible implementation of the third aspect of the embodiments of this application, in time domain, the second resource is a subset of the first resource; or in time domain, the second resource is a subset of a sum of the first resource and a time domain resource that carries the first indication information.

In a possible implementation of the third aspect of the embodiments of this application, the first indication information indicates a relative time domain location between the first resource and the second resource.

In a possible implementation of the third aspect of the embodiments of this application, in frequency domain, the second resource is a subset of the first resource.

In a possible implementation of the third aspect of the embodiments of this application, in frequency domain, the bandwidth of the second resource is greater than or equal to a bandwidth of a third resource, where the third resource carries a primary synchronization signal or a secondary synchronization signal in the synchronization signal block.

In a possible implementation of the third aspect of the embodiments of this application, the time domain location for carrying the first indication information is located after a time domain location of the first resource, or the time domain location for carrying the first indication information is located before the time domain location of the first resource.

In a possible implementation of the third aspect of the embodiments of this application, the first indication information and the synchronization signal block are located in a same slot.

In a possible implementation of the third aspect of the embodiments of this application, a transmit beam of the first indication information is the same as a transmit beam of the synchronization signal block.

In a possible implementation of the third aspect of the embodiments of this application, the first indication information is carried in DCI, a CRC corresponding to the DCI is scrambled by using a first identifier, and the first identifier is a preset value, or the first identifier is determined based on a cell identity corresponding to the synchronization signal block.

In a possible implementation of the third aspect of the embodiments of this application, the first indication information further indicates that the second system message is sent.

In a possible implementation of the third aspect of the embodiments of this application, the time domain resource occupied by the first indication information is one or more OFDM symbols in a first slot, where the time domain resource occupied by the first indication information is located after a time domain resource occupied by the last synchronization signal block in the first slot; or the time domain resource occupied by the first indication information is located after a time domain resource occupied by the synchronization signal block in the first slot.

In a possible implementation of the third aspect of the embodiments of this application, the first indication information further indicates whether the terminal device listens to one or more POs located after the time domain location of the first indication information.

In a possible implementation of the third aspect of the embodiments of this application, the first indication information further indicates whether a third system message of the terminal device is updated.

In a possible implementation of the third aspect of the embodiments of this application, the first indication information further indicates whether the terminal device is allowed to select, during cell selection/reselection, a cell that has a same frequency as a barred cell.

In a possible implementation of the third aspect of the embodiments of this application, the first indication information further indicates whether a cell corresponding to the synchronization signal block is a barred cell.

In a possible implementation of the third aspect of the embodiments of this application, the first indication information further indicates whether the synchronization signal block includes a SIB1.

In a possible implementation of the third aspect of the embodiments of this application, the first indication information further indicates that a resource multiplexing manner for the first resource and the second resource is TDM or FDM.

In a possible implementation of the third aspect of the embodiments of this application, the first indication information is further used for RRM measurement.

In a possible implementation of the third aspect of the embodiments of this application, the first indication information further indicates a radio frame number of the first indication information or N least significant bits of the radio frame number, where N is a positive integer.

In a possible implementation of the third aspect of the embodiments of this application, the first system message is a first MIB carried on a first PBCH, and the second system message is a second MIB carried on a second PBCH.

In a possible implementation of the third aspect of the embodiments of this application, the first MIB is the same as the second MIB.

In a possible implementation of the third aspect of the embodiments of this application, a first complex symbol obtained after modulation and encoding of the first MIB is mapped to the first resource, a second complex symbol obtained after modulation and encoding of the second MIB is mapped to the second resource, and the second complex symbol is a subset of the first complex symbol.

In the third aspect of the embodiments of this application, the composition modules of the communications apparatus may be further configured to perform the steps performed in the possible implementations of the first aspect. For details, refer to the first aspect. Details are not described herein again.

A fourth aspect of the embodiments of this application provides a communications apparatus, including a processing unit and a transceiver unit.

The transceiver unit is configured to receive first indication information from a network device, where the first indication information indicates a relative location between a first resource and a second resource, the first resource carries a synchronization signal block, the synchronization signal block includes a first system message, the second resource carries a second system message, and a bandwidth of the second resource is less than a bandwidth of the first resource.

The processing unit is configured to determine a location of the second resource based on the first indication information.

The transceiver unit is further configured to receive the second system message from the network device on the second resource.

In a possible implementation of the fourth aspect of the embodiments of this application, the first indication information indicates a relative frequency domain location between the first resource and the second resource.

In a possible implementation of the fourth aspect of the embodiments of this application, when a signal sequence that carries the first indication information is a first sequence, the first indication information indicates that the first resource is located at a low frequency location of the second resource in frequency domain; and when the signal sequence that carries the first indication information is a second sequence, the first indication information indicates that the first resource is located at a high frequency location of the second resource in frequency domain, where the first sequence is different from the second sequence.

In a possible implementation of the fourth aspect of the embodiments of this application, in time domain, the second resource is a subset of the first resource; or in time domain, the second resource is a subset of a sum of the first resource and a time domain resource that carries the first indication information.

In a possible implementation of the fourth aspect of the embodiments of this application, the first indication information indicates a relative time domain location between the first resource and the second resource.

In a possible implementation of the fourth aspect of the embodiments of this application, in frequency domain, the second resource is a subset of the first resource.

In a possible implementation of the fourth aspect of the embodiments of this application, in frequency domain, the bandwidth of the second resource is greater than or equal to a bandwidth of a third resource, where the third resource carries a primary synchronization signal or a secondary synchronization signal in the synchronization signal block.

In a possible implementation of the fourth aspect of the embodiments of this application, the time domain location for carrying the first indication information is located after a time domain location of the first resource, or the time domain location for carrying the first indication information is located before the time domain location of the first resource.

In a possible implementation of the fourth aspect of the embodiments of this application, the first indication information and the synchronization signal block are located in a same slot.

In a possible implementation of the fourth aspect of the embodiments of this application, the transceiver unit is further configured to receive a first part of the synchronization signal block; and the processing unit is further configured to determine, based on the first part of the synchronization signal block, a time domain location for carrying the first indication information.

In a possible implementation of the fourth aspect of the embodiments of this application, the first indication information is carried in DCI, a CRC corresponding to the DCI is scrambled by using a first identifier, and the first identifier is a preset value, or the first identifier is determined based on a cell identity corresponding to the synchronization signal block.

In a possible implementation of the fourth aspect of the embodiments of this application, the first indication information further indicates that the second system message is sent.

In a possible implementation of the fourth aspect of the embodiments of this application, the time domain resource occupied by the first indication information is one or more OFDM symbols in a first slot, where the time domain resource occupied by the first indication information is located after a time domain resource occupied by the last synchronization signal block in the first slot; or the time domain resource occupied by the first indication information is located after a time domain resource occupied by the synchronization signal block in the first slot.

In a possible implementation of the fourth aspect of the embodiments of this application, the first indication information further indicates whether the terminal device listens to one or more POs located after the time domain location of the first indication information.

In a possible implementation of the fourth aspect of the embodiments of this application, the first indication information further indicates whether a third system message of the terminal device is updated.

In a possible implementation of the fourth aspect of the embodiments of this application, the first indication information further indicates whether the terminal device is allowed to select, during cell selection/reselection, a cell that has a same frequency as a barred cell.

In a possible implementation of the fourth aspect of the embodiments of this application, the first indication information further indicates whether a cell corresponding to the synchronization signal block is a barred cell.

In a possible implementation of the fourth aspect of the embodiments of this application, the first indication information further indicates whether the synchronization signal block includes a SIB1.

In a possible implementation of the fourth aspect of the embodiments of this application, the first indication information further indicates that a resource multiplexing manner for the first resource and the second resource is TDM or FDM.

In a possible implementation of the fourth aspect of the embodiments of this application, the first indication information is further used for RRM measurement.

In a possible implementation of the fourth aspect of the embodiments of this application, the first indication information further indicates a radio frame number of the first indication information or N least significant bits of the radio frame number, where N is a positive integer.

In a possible implementation of the fourth aspect of the embodiments of this application, the first system message is a first MIB carried on a first PBCH, and the second system message is a second MIB carried on a second PBCH.

In a possible implementation of the fourth aspect of the embodiments of this application, the first MIB is the same as the second MIB.

In a possible implementation of the fourth aspect of the embodiments of this application, a first complex symbol obtained after modulation and encoding of the first MIB is mapped to the first resource, a second complex symbol obtained after modulation and encoding of the second MIB is mapped to the second resource, and the second complex symbol is a subset of the first complex symbol.

In the fourth aspect of the embodiments of this application, the composition modules of the communications apparatus may be further configured to perform the steps performed in the possible implementations of the second aspect. For details, refer to the second aspect. Details are not described herein again.

A fifth aspect of the embodiments of this application provides a communications apparatus. The communications apparatus includes at least one processor and an interface circuit. The interface circuit is configured to provide a program or instructions for the at least one processor. The at least one processor is configured to execute the program or the instructions, so that the communications apparatus implements the method according to any one of the first aspect or the possible implementations of the first aspect.

A sixth aspect of the embodiments of this application provides a communications apparatus. The communications apparatus includes at least one processor and an interface circuit. The interface circuit is configured to provide a program or instructions for the at least one processor. The at least one processor is configured to execute the program or the instructions, so that the communications apparatus implements the method according to any one of the second aspect or the possible implementations of the second aspect.

A seventh aspect of the embodiments of this application provides a computer-readable storage medium storing one or more computer-executable instructions. When the computer-executable instructions are executed by a processor, the processor performs the method according to any one of the first aspect or the possible implementations of the first aspect.

An eighth aspect of the embodiments of this application provides a computer-readable storage medium storing one or more computer-executable instructions. When the computer-executable instructions are executed by a processor, the processor performs the method according to any one of the second aspect or the possible implementations of the second aspect.

A ninth aspect of the embodiments of this application provides a computer program product (or referred to as a computer program) storing one or more computers. When the computer program product is executed by a processor, the processor performs the method according to any one of the first aspect or the possible implementations of the first aspect.

A tenth aspect of the embodiments of this application provides a computer program product storing one or more computers. When the computer program product is executed by a processor, the processor performs the method according to any one of the second aspect or the possible implementations of the second aspect.

An eleventh aspect of the embodiments of this application provides a chip system. The chip system includes at least one processor, configured to support a communications apparatus in implementing functions in any one of the first aspect or the possible implementations of the first aspect.

In a possible design, the chip system may further include a memory. The memory is configured to store program instructions and data that are for the communications apparatus. The chip system may include a chip, or may include a chip and another discrete component. Optionally, the chip system further includes an interface circuit, and the interface circuit provides program instructions and/or data for the at least one processor.

A twelfth aspect of the embodiments of this application provides a chip system. The chip system includes at least one processor, configured to support a communications apparatus in implementing functions in any one of the second aspect or the possible implementations of the second aspect.

In a possible design, the chip system may further include a memory. The memory is configured to store program instructions and data that are for the communications apparatus. The chip system may include a chip, or may include a chip and another discrete component. Optionally, the chip system further includes an interface circuit, and the interface circuit provides program instructions and/or data for the at least one processor.

A thirteenth aspect of the embodiments of this application provides a communications system. The communications system includes the communications apparatus according to the third aspect and the communications apparatus according to the fourth aspect, and/or the communications system includes the communications apparatus according to the fifth aspect and the communications apparatus according to the sixth aspect.

For technical effects brought by the third aspect, the fifth aspect, the seventh aspect, the ninth aspect, the eleventh aspect, the thirteenth aspect, or any possible implementation thereof, refer to technical effects brought by the first aspect or different possible implementations of the first aspect. Details are not described herein.

For technical effects brought by the fourth aspect, the sixth aspect, the eighth aspect, the tenth aspect, the twelfth aspect, the thirteenth aspect, or any possible implementation thereof, refer to technical effects brought by the second aspect or different possible implementations of the second aspect. Details are not described herein.

It can be learned from the foregoing technical solutions that the embodiments of this application have the following advantages: In the method, the network device sends the first indication information, where the first indication information indicates the relative location between the first resource and the second resource, the first resource carries the synchronization signal block, the synchronization signal block includes the first system message, the second resource carries the second system message, and the bandwidth of the second resource is less than the bandwidth of the first resource. The network device sends the synchronization signal block and the second system message to the terminal device based on the first indication information. The first resource carries the synchronization signal block including the first system message, the second resource carries the second system message, and the bandwidth of the second resource is less than the bandwidth of the first resource. Therefore, when the operating bandwidth of the terminal device is a narrowband, time-frequency synchronization is obtained based on the second system message, to implement network communication. This avoids a communication failure and improves communication efficiency.

DESCRIPTION OF EMBODIMENTS

Figure 1:
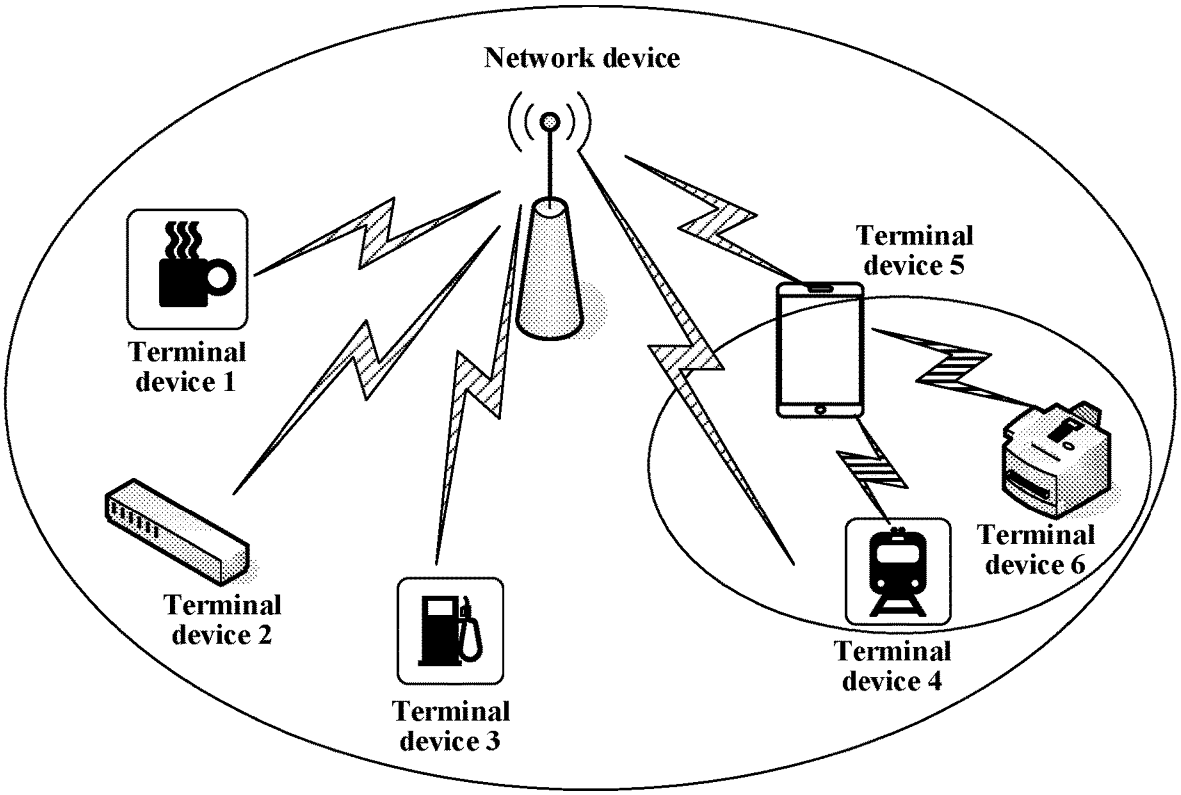
FIG. 1 is a schematic diagram of a communications system according to an embodiment of this application.

The following describes the technical solutions in embodiments of this application with reference to the accompanying drawings in embodiments of this application. It is clear that the described embodiments are merely some rather than all of embodiments of this application. All other embodiments obtained by a person of ordinary skill in the art based on embodiments of this application without creative efforts shall fall within the protection scope of this application.

First, some terms in embodiments of this application are explained and described, to facilitate understanding of a person skilled in the art.

(1) Terminal device: The terminal device may be a wireless terminal device that can receive scheduling and indication information from a network device. The wireless terminal device may be a device that provides a user with voice and/or data connectivity, a handheld device with a wireless connection function, or another processing device connected to a wireless modem.

The terminal device may communicate with one or more core networks or the internet through a radio access network (RAN). The terminal device may be a mobile terminal device, for example, a mobile phone (or referred to as a "cellular" phone or a mobile phone), a computer, or a data card. For example, the terminal device may be a portable, pocket-sized, handheld, computer built-in, or vehicle-mounted mobile apparatus that exchanges voice and/or data with the radio access network. For example, the terminal device may be a device such as a personal communications service (PCS) phone, a cordless phone, a session initiation protocol (SIP) phone, a wireless local loop (WLL) station, a personal digital assistant (PDA), a tablet computer, or a computer having a wireless transceiver function. The wireless terminal device may also be referred to as a system, a subscriber unit, a subscriber station, a mobile station (MS), a remote station, an access point (AP), a remote terminal device, an access terminal device, a user terminal device, a user agent, a subscriber station (SS), customer premises equipment (CPE), a terminal, user equipment (UE), a mobile terminal (MT), or the like. The terminal device may alternatively be a wearable device, a terminal device in a next-generation communications system such as a 5G communications system, a terminal device in a future evolved public land mobile network (PLMN), or the like.

(2) Network device: The network device may be a device in a wireless network. For example, the network device may be a RAN node (or device) through which the terminal device accesses the wireless network. The network device may also be referred to as a base station. Currently, some examples of the RAN device are: a next-generation NodeB (gNodeB) in a 5G communications system, a transmission reception point (TRP), an evolved NodeB (eNB), a radio network controller (RNC), a NodeB (NB), a base station controller (BSC), a base transceiver station (BTS), a home base station (for example, a home evolved NodeB or a home NodeB, HNB), a baseband unit (BBU), a wireless fidelity (Wi-Fi) access point (AP), or the like. In addition, in a network structure, the network device may include a central unit (CU) node or a distributed unit (DU) node, or a RAN device including a CU node and a DU node.

The network device can send configuration information (for example, carried in a scheduling message and/or an indication message) to the terminal device, and the terminal device further performs network configuration based on the configuration information, so that network configurations of the network device and the terminal device are aligned. Alternatively, network configurations of the network device and the terminal device are aligned by presetting the network configuration of the network device and the network configuration of the terminal device. Aligned means that, when there is an interaction message between the network device and the terminal device, the network device and the terminal device have a consistent understanding of a carrier frequency for sending and receiving the interaction message, determining of an interaction message type, a meaning of field information carried in the interaction message, or another configuration of the interaction message.

In addition, in another possible case, the network device may be another apparatus that provides a wireless communication function for the terminal device. A specific technology and a specific device form that are used by the network device are not limited in embodiments of this application. For ease of description, this is not limited in embodiments of this application.

The network device may further include a core network device. The core network device includes, for example, an access and mobility management function (AMF), a user plane function (UPF), or a session management function (SMF).

In embodiments of this application, an apparatus configured to implement a function of the network device may be a network device, or may be an apparatus, for example, a chip system, that can support the network device in implementing the function. The apparatus may be installed in the network device. In the technical solutions provided in embodiments of this application, an example in which the apparatus configured to implement the function of the network device is the network device is used to describe the technical solutions provided in embodiments of this application.

(3) Slot: In a new radio (NR) system, the slot is a minimum scheduling unit of time. The time is divided into periodic frames, and each frame is divided into several slots. The frames or slots do not overlap each other. Each slot can be used as an elementary unit for communication. Duration of the slot is determined by a subcarrier spacing used during transmission. For example, for a 15 kilohertz (kHz) subcarrier spacing, duration of one slot may be 1 millisecond (ms). For another example, for a 30 kHz subcarrier spacing, duration of one slot may be 0.5 ms. For still another example, for a 60 kHz subcarrier spacing, duration of one slot may be 0.25 ms. For still another example, for a 120 kHz subcarrier spacing, duration of one slot may be 0.125 ms. Optionally, when one slot is used as an elementary scheduling unit, all symbols in the one slot may be used for transmission, or some symbols in the one slot may be used for transmission. This is not limited here. For example, a quantity of symbols in one slot may be 12 or 14.

(4) Configuration and preconfiguration: In this application, both the configuration and the preconfiguration are performed. The configuration means that the network device such as a base station or a server sends configuration information of some parameters or parameter values to the terminal by using a message or signaling, so that the terminal determines a communication parameter or a transmission resource based on the values or the information. Similar to the configuration, the preconfiguration may be a manner in which the network device such as the base station or the server sends parameter information or a value to the terminal through a communications link or a carrier, or may be a manner in which a corresponding parameter or parameter value is defined (for example, the parameter value is explicitly specified in a standard), or a related parameter or value is written into the terminal device in advance. This is not limited in this application. Further, these values and parameters may be changed or updated.

(5) Terms "system" and "network" may be used interchangeably in embodiments of this application. In addition, "at least one" means one or more, and "a plurality of" means two or more. A term "and/or"

describes an association relationship between associated objects and represents that three relationships may exist. For example, A and/or B may represent the following cases: Only A exists, both A and B exist, and only B exists, where A and B may be singular or plural. A character "/" generally indicates an "or" relationship between the associated objects. In addition, "at least one of the following items (pieces)" or a similar expression thereof indicates any combination of these items, including a single item (piece) or any combination of a plurality of items (pieces). For example, "at least one of A, B, and C" includes A, B, C, A and B, A and C, B and C, or A, B, and C. In addition, unless otherwise specified, ordinal numbers such as "first" and "second" mentioned in embodiments of this application are used to distinguish between a plurality of objects, but are not used to limit a sequence, a time sequence, priorities, or importance of the plurality of objects.

This application may be applied to a long term evolution (LTE) system, an NR system, or another communications system. The communications system includes a network device and a terminal device. The network device serves as a configuration information sending entity, and the terminal device serves as a configuration information receiving entity. For example, in the communications system, an entity sends configuration information to another entity, and sends data to the another entity, or receives data sent by the another entity. The another entity receives the configuration information, and sends data to the configuration information sending entity based on the configuration information, or receives data sent by the configuration information sending entity. This application may be applied to a terminal device in a connected state or an active state, or may be applied to a terminal device in a non-connected state or an idle state.

FIG. 1 is a schematic diagram of a communications system according to this application. FIG. 1 shows an example of one network device 101 and six terminal devices. The six terminal devices are respectively a terminal device 1, a terminal device 2, a terminal device 3, a terminal device 4, a terminal device 5, and a terminal device 6. In the example shown in FIG. 1, an example in which the terminal device 1 is a smart tea cup, the terminal device 2 is a smart air conditioner, the terminal device 3 is a smart tanker, the terminal device 4 is a vehicle, the terminal device 5 is a mobile phone, and the terminal device 6 is a printer is used for description.

As shown in FIG. 1, a configuration information sending entity may be the network device. An example in which the network device is a base station and each terminal device is UE is used for description. Configuration information receiving entities may be UE 1 to UE 6. In this case, the base station and the UE 1 to the UE 6 form a communications system. In the communications system, the UE 1 to the UE 6 may send uplink data to the network device, and the network device needs to receive the uplink data sent by the UE 1 to the UE 6. In addition, the network device may send configuration information to the UE 1 to the UE 6.

In addition, in FIG. 1, the UE 4 to the UE 6 may also form a communications system. In this case, both a configuration information sending entity and a configuration information receiving entity may be UE. The UE 5 serves as the network device, that is, the configuration information sending entity. The UE 4 and the UE 6 serve as the terminal devices, that is, the configuration information receiving entities. For example, in an internet of vehicles system, the UE 5 separately sends configuration information to the UE 4 and the UE 6, and receives uplink data sent by the UE 4 and the UE 6. Correspondingly, the UE 4 and the UE 6 receive the configuration information sent by the UE 5, and send the uplink data to the UE 5.

The communications system shown in FIG. 1 may be applied to an NR network. In NR, an elementary unit in frequency domain is one subcarrier, and a subcarrier spacing (SCS) may be 15 kHz, 30 kHz, or the like. At an NR physical layer, a unit of an uplink/downlink frequency domain resource is a physical resource block (PRB), and each PRB includes 12 consecutive subcarriers in frequency domain.

Figure 2:
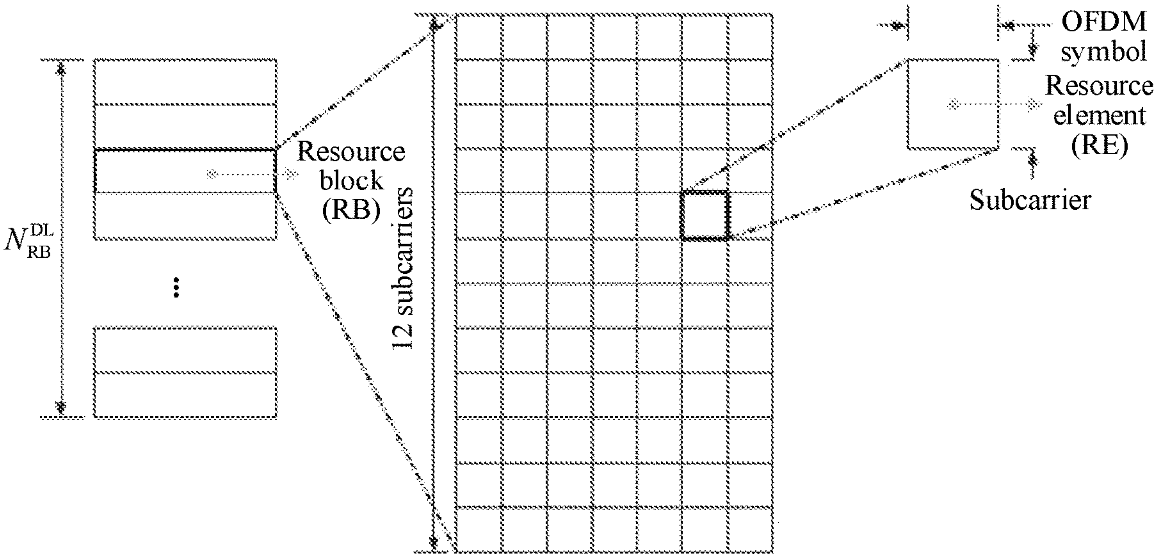
FIG. 2 is a schematic diagram of a radio frame structure according to an embodiment of this application.

FIG. 2 is a schematic diagram of a structure of a radio frame according to this application. As shown in FIG. 2, the radio frame is an implementation example of a downlink time-frequency resource grid. Each element in the resource grid is referred to as a resource element (RE), and the RE is a smallest physical resource, and includes one subcarrier in one OFDM symbol. An uplink time-frequency resource grid is similar to the downlink time-frequency resource grid. An elementary time unit for downlink resource scheduling in NR is a slot. Usually, one slot includes 14 OFDM symbols in time. In time domain, NR transmission is organized into a frame with a time length of 10 ms, each frame is divided into 10 subframes with a same size length of 1 ms, and each subframe may include one or more slots (which is determined based on a subcarrier spacing, where each subframe includes one slot when a subcarrier is 15 kHz). Each frame is identified by a system frame number (SFN). A period of the SFN is equal to 1024. Therefore, the SFN is self-repeated after 1024 frames.

In addition, in an NR technology in a fifth generation (5G) mobile communications system, a synchronization signal/physical broadcast channel block (SS/PBCH block or SSB) is further defined, and the SSB may also be referred to as a synchronization signal block or an initial access signal for short. One SSB includes a primary synchronization signal (PSS), a secondary synchronization signal (SSS), and a physical broadcast channel (PBCH) carrying a master information block (MIB).

Figure 3:
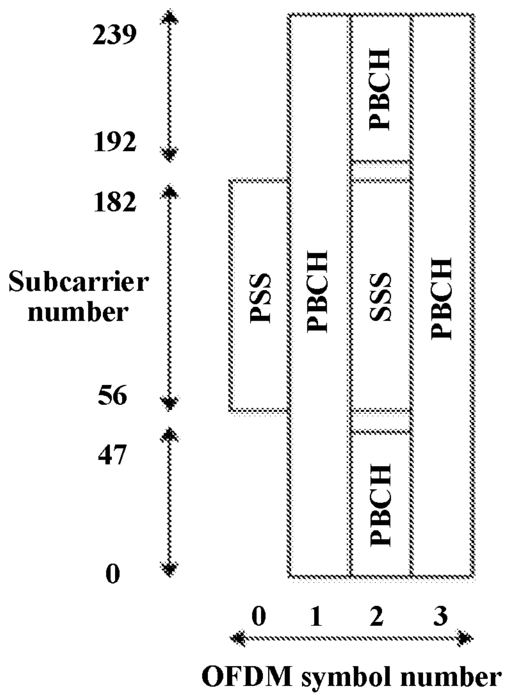
FIG. 3 is another schematic diagram of a radio frame structure according to an embodiment of this application.

FIG. 3 is a schematic diagram of a structure of a radio frame according to this application. As shown in FIG. 3, the radio frame is an implementation example of an SSB in an NR system. In time domain, one SSB occupies four consecutive orthogonal frequency division multiplexing (OFDM) symbols. In frequency domain, one SSB occupies 240 consecutive subcarriers, and the 240 subcarriers are sequentially numbered from 0 to 239 in ascending order of frequencies. As shown in FIG. 3, the $1^{st}$ OFDM symbol from the left carries a PSS, subcarriers numbered 0, 1, . . . , 55, 183, 184, . . . , and 239 are set to 0, and subcarriers numbered 56, 57, . . . , and 182 are subcarriers occupied by the PSS; the $2^{nd}$ OFDM symbol and the $4^{th}$ OFDM symbol from the left carry a PBCH, and one of every four consecutive subcarriers is a DMRS corresponding to the PBCH; and the $3^{rd}$ OFDM symbol from the left carries an SSS and a PBCH, the subcarriers numbered 56, 57, . . . , and 182 are set to the SSS, subcarriers numbered 0, 1, . . . , 47, 192, 193, . . . , and 239 are set to the PBCH, and the other subcarriers are set to 0.

As shown in FIG. 3, currently in NR, the SSB occupies 240 subcarriers in frequency domain, the PSS/SSS occupies 127 subcarriers, and the PBCH occupies 240 subcarriers. A bandwidth occupied by the PBCH in frequency domain is a product of a quantity of subcarriers occupied by the PBCH and a subcarrier spacing corresponding to the SSB. When an operating band is in a frequency range (FR) 1, the subcarrier spacing corresponding to the SSB may be 15 kHz or 30 kHz. When the subcarrier spacing corresponding to the SSB is 15 kHz, the bandwidth occupied by the PBCH in frequency domain is about 3.6 MHz. When the subcarrier spacing corresponding to the SSB is 30 kHz, the bandwidth occupied by the PBCH in frequency domain is about 7.2 MHz.

The foregoing PBCH design is mainly used for a terminal device with a relatively large operating bandwidth. To support an internet of things (IoT) application with relatively low costs, a most direct means is to reduce the operating bandwidth of the terminal device. This is because a large bandwidth has high requirements on baseband processing of an analog-to-digital converter (ADC), a digital-to-analog converter (DAC), fast Fourier transform (FFT), a buffer, a downlink (DL)/uplink (UL) processing module, and the like, but a small bandwidth may relax these hardware requirements, so that costs are reduced. Therefore, to support the internet of things application with relatively low costs, a terminal device with a relatively small operating bandwidth (or referred to as a narrowband terminal, a narrowband terminal, or the like) is introduced into the NR system.

In areas with poor wireless network signals, such as indoor areas and basements, a coverage enhancement technology is required. Generally, a communications network used for IoT has the following characteristics:

1. Support for a large quantity of low-rate devices: A quantity of MTC devices is far greater than a quantity of devices for human-to-human communication. However, the MTC device transmits small data packets and is insensitive to a delay.
2. Extremely low costs: Many MTC applications require to obtain and use the MTC devices at extremely low costs, to deploy the MTC devices in a large scale.
3. Low energy consumption: In most cases, the MTC device is powered by a battery. However, in many scenarios, MTC further requires that the MTC device can be used for more than 10 years without replacing the battery. This requires the MTC device to work with extremely low power consumption.

However, a current initial access signal for accessing the network device by the terminal device is generally designed based on a large bandwidth. In other words, the terminal device needs to have a capability of receiving the initial access signal in a frequency band of a large bandwidth. Consequently, when the operating bandwidth of the terminal device is a narrow bandwidth, the terminal device cannot completely receive the initial access signal for communication, causing a communication failure and affecting communication efficiency.

To resolve the foregoing problem, embodiments of this application provide a communication method and a communications apparatus. Therefore, when an operating bandwidth of a terminal device is a narrow bandwidth, time-frequency synchronization is performed on a resource with a relatively small bandwidth, to implement network communication. This avoids a communication failure and improves communication efficiency.

Before the method in the embodiments of this application is described, the following first describes a solution idea of the foregoing problem in this application. It can be learned from the foregoing descriptions in FIG. 1 to FIG. 3 that, when a terminal device whose operating bandwidth is a large bandwidth is used in NR, a used SSB occupies 240 subcarriers in frequency domain, and a PSS/SSS occupies 127 subcarriers in frequency domain. When the subcarrier spacing corresponding to the SSB is 15 kHz, the PSS/SSS occupies a bandwidth of 1.905 megahertz (MHz) in frequency domain, and the PBCH occupies a bandwidth of about 3.6 MHz in frequency domain. When the subcarrier spacing corresponding to the SSB is 30 kHz, the PSS/SSS occupies a bandwidth of 3.81 MHz in frequency domain, and the PBCH occupies a bandwidth of about 7.2 MHz in frequency domain.

Figure 4:
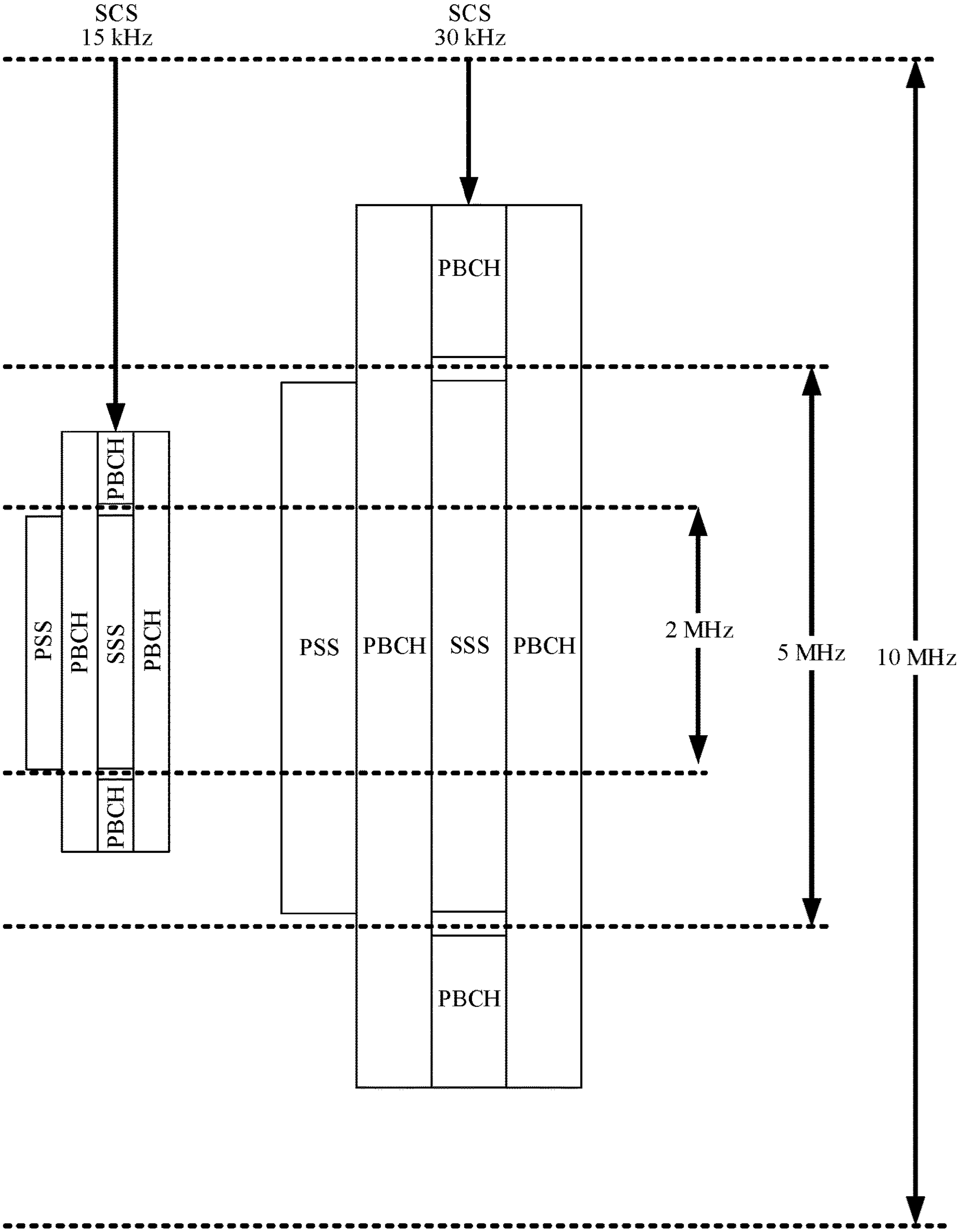
FIG. 4 is another schematic diagram of a radio frame structure according to an embodiment of this application.

It is assumed that three types of narrowband terminals with different operating bandwidth capabilities may be introduced into the NR system, namely, narrowband terminals with operating bandwidths of 2 MHz, 5 MHz, and 10 MHz. To identify a problematic scenario, an operating bandwidth of a narrowband terminal is compared with a bandwidth carrying an SSB in NR. As shown in FIG. 4, an SCS in the figure represents a subcarrier spacing, and a grid area in an SSB represents an area filled with “0”. It can be learned from FIG. 4 that, when a subcarrier spacing corresponding to the SSB is 15 kHz, a narrowband terminal device whose operating bandwidth capability is 2 MHz can completely receive a PSS/SSS, but cannot completely receive a PBCH; and when the subcarrier spacing corresponding to the SSB is 30 kHz, a narrowband terminal device whose operating bandwidth capability is 5 MHz can completely receive the PSS/SSS, but cannot completely receive the PBCH.

In the foregoing scenario, a terminal device with a relatively small operating bandwidth can completely receive the PSS/SSS, but cannot completely receive an MIB (denoted as a first system message) carried on the PBCH. A network device needs to additionally send a new MIB (denoted as a second system message) carried on another PBCH, so that the terminal device with a relatively small operating bandwidth can receive the complete SSB and implement network communication.

Based on the foregoing discussion, according to the communication method and the communications apparatus provided in this application, the second system message is designed for the terminal device with a relatively small operating bandwidth, and a relative location between the second system message and the SSB is indicated by using indication information, so as to prevent the terminal device with a relatively small operating bandwidth from performing blind detection at different frequency domain locations when the terminal device receives the second system message. This can reduce implementation complexity of receiving the second system message, and can further reduce power consumption of receiving the second system message.

Figure 5:
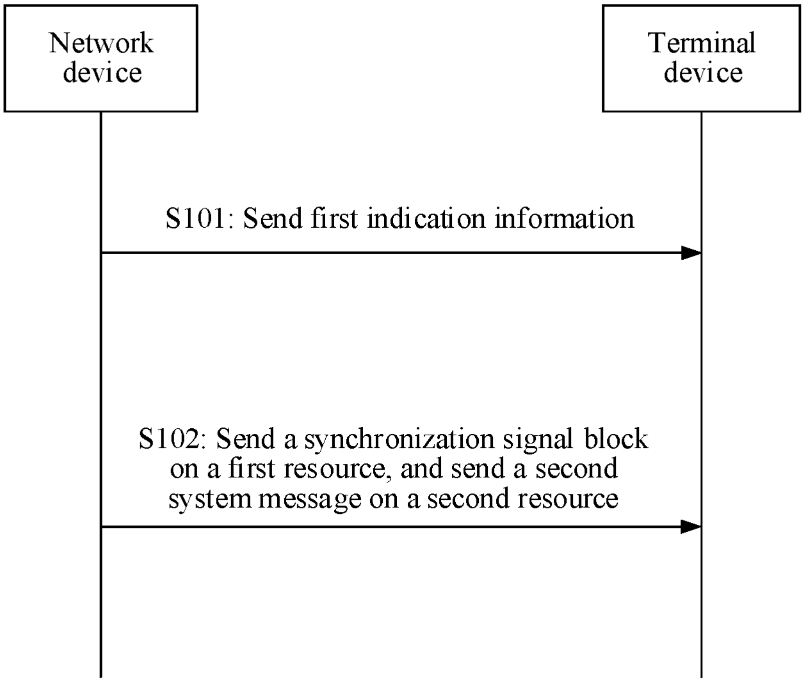
FIG. 5 is a schematic diagram of a communication method according to an embodiment of this application.

FIG. 5 is a schematic diagram of a communication method according to an embodiment of this application. The method includes the following steps.

S101: A network device sends first indication information to a terminal device.

In this embodiment, the network device sends the first indication information to the terminal device in step S101. Correspondingly, the terminal device receives the indication information from the network device in step S101. The first indication information indicates a relative location between a first resource and a second resource, the first resource carries a synchronization signal block, the synchronization signal block includes a first system message, the second resource carries a second system message, and a bandwidth of the second resource is less than a bandwidth of the first resource.

S102: The network device sends the synchronization signal block to the terminal device on the first resource, and sends the second system message to the terminal device on the second resource.

In this embodiment, in step S102, the network device sends the first indication information to the terminal device on the first resource, and sends the second system message to the terminal device on the second resource. Correspondingly, a terminal device whose operating bandwidth is a narrowband receives at least the second system message from the network device in step S102.

It should be noted that, when the operating bandwidth of the terminal device is a large bandwidth, in step S102, time-frequency synchronization may be performed based on the first indication information, to implement network communication, or in step S102, time-frequency synchronization is performed through preconfiguration without depending on the first indication information, to implement network communication, or in step S102, time-frequency synchronization is performed by using other information configured by the network device, without depending on the first indication information, to implement network communication. This is not limited herein.

In some embodiments, in step S101, a system message configured by the network device for a terminal device with a relatively large operating bandwidth includes at least the first system message in the synchronization signal block carried in the first resource; and in step S101, a system message configured by the network device for a terminal device with a relatively small operating bandwidth includes at least the second system message carried in the second resource. The terminal device with a relatively large operating bandwidth and the terminal device with a relatively small operating bandwidth may be classified by using an operating bandwidth value. For example, terminal devices with different operating bandwidths may be classified by using an example shown in FIG. 4. For example, a terminal device whose operating bandwidth is greater than or equal to 3.6 MHz is determined as a terminal device with a relatively large operating bandwidth, and a terminal device whose operating bandwidth is less than or equal to 2 MHz is determined as a terminal device with a relatively small operating bandwidth; or a terminal device whose operating bandwidth is greater than or equal to 7.2 MHz is determined as a terminal device with a relatively large operating bandwidth, and a terminal device whose operating bandwidth is less than or equal to 5 MHz is determined as a terminal device with a relatively small operating bandwidth. Alternatively, terminal devices with different operating bandwidths are classified by using other bandwidth values instead of the example in FIG. 4, so as to separately classify a terminal device with a relatively large operating bandwidth and a terminal device with a relatively small operating bandwidth. This may be determined based on an application scenario, and is not limited herein.

In addition, in a possible implementation, in frequency domain, the bandwidth of the second resource is greater than or equal to a bandwidth of a third resource, where the third resource carries a primary synchronization signal or a secondary synchronization signal in the synchronization signal block. A bandwidth of each of the primary synchronization signal and the secondary synchronization signal in the synchronization signal block carried in the first resource is less than the bandwidth of the first resource. When the operating bandwidth of the terminal device is a narrowband, after receiving the second system message in step S102, the terminal device may subsequently perform, by using the second system message, complete time-frequency synchronization with reference to the primary synchronization signal and the secondary synchronization signal carried in the third resource. In this way, terminal devices with different operating bandwidths can subsequently reuse the primary synchronization signal and the secondary synchronization signal in the synchronization signal block carried in the first resource. Compared with a manner in which the network device separately configures the primary synchronization signal and the secondary synchronization signal for the terminal devices with different operating bandwidths, this can reduce signaling consumption of the network device.

It should be noted that a time-frequency domain resource included in the first resource carrying the synchronization signal block may be a time-frequency domain resource occupied by the SSB in the NR system shown in FIG. 3, or may be a time-frequency domain resource occupied by a synchronization signal block in an LTE system, or may be a time-frequency domain resource occupied by a synchronization signal block in another communications system. This is not limited herein. This embodiment and the following embodiments are described merely by using an example in which the first resource is the time-frequency domain resource occupied by the SSB in the radio frame structure shown in FIG. 3. For example, the synchronization signal block carried in the first resource is an SSB in NR. In time domain, one SSB occupies four consecutive OFDM symbols. In frequency domain, one SSB occupies 240 consecutive subcarriers, and the 240 subcarriers are sequentially numbered from 0 to 239 in ascending order of frequencies. As shown in FIG. 3, the $1^{st}$ OFDM symbol from the left carries a PSS, and subcarriers numbered 56, 57, . . . , and 182 are subcarriers occupied by the PSS; the $2^{nd}$ OFDM symbol and the $4^{th}$ OFDM symbol from the left carry a PBCH; and the $3^{rd}$ OFDM symbol from the left carries an SSS and a PBCH, the subcarriers numbered 56, 57, . . . , and 182 are set to the SSS, and subcarriers numbered 0, 1, . . . , 47, 192, 193, . . . , and 239 are set to the PBCH.

In this embodiment, the first indication information sent by the network device in step S101 may be carried in a plurality of different manners. The following uses an implementation example to describe the manner of carrying the first indication information.

In a possible implementation, in step S101, the network device may send the first indication information based on a time domain location of the first resource, where a time domain location for carrying the first indication information is located after the time domain location of the first resource, or the time domain location for carrying the first indication information is located before the time domain location of the first resource, or the time domain location for carrying the first indication information is a subset of the time domain location of the first resource, that is, a resource multiplexing relationship between a time domain resource that carries the first indication information and the first resource is TDM. There may be an association relationship between the time domain location of the first resource and the time domain location for carrying the first indication information. For example, in time domain, the first resource and the time domain resource that carries the first indication information are adjacent or are spaced by a quantity of OFDM symbols. In this way, in step S101, the terminal device determines the time domain location of the first resource through configuration or preconfiguration, and further receives the first indication information after (or before) the time domain location of the first resource, so that the terminal device is prevented from performing blind detection on different time domain resources when the terminal device receives the first indication information. This can reduce complexity of receiving the first indication information by the terminal device, and can further reduce a delay and power consumption of receiving the first indication information by the terminal device and improve communication efficiency.

In addition, according to the foregoing technical solution, when the time domain location for carrying the first indication information is located before the time domain location of the first resource, after the terminal device obtains time-frequency synchronization on the first resource based on the synchronization signal block, the terminal device may receive and detect the first indication information as soon as possible. This reduces a delay of obtaining the first indication information, and further reduces a delay of obtaining the second system message. When the time domain location for carrying the first indication information is located after the time domain location of the first resource, a probability of a conflict between the first indication information and a control signal can be reduced, so that detection performance of the first indication information is ensured.

In a possible implementation, the first indication information sent by the network device in step S101 and the synchronization signal block carried in the first resource may be located in a same slot. An elementary time unit for downlink resource scheduling in a communications system is generally one slot, and the network device may perform scheduling by adding the first indication information and the synchronization signal block to a same slot. Compared with a manner in which different signals are carried in different slots, this can reduce complexity of performing downlink scheduling by the network device.

In addition, when the first indication information and the synchronization signal block carried in the first resource may be located in a same slot (denoted as a first slot), the time domain resource occupied by the first indication information may be one or more OFDM symbols in the first slot, where the time domain resource occupied by the first indication information is located after a time domain resource occupied by the last synchronization signal block in the first slot; or the time domain resource occupied by the first indication information is located after a time domain resource occupied by the synchronization signal block in the first slot. An elementary time unit for downlink resource scheduling in a communications system is generally one slot, one slot includes a plurality of OFDM symbols, and the first indication information may be scheduled based on a slot. Further, the first indication information and the synchronization signal block may be placed in a same slot for scheduling, and the first indication information may be carried, in different manners, between different synchronization signal blocks included in a same slot.

In a possible implementation, before step S101, the terminal device may first receive a first part of the synchronization signal block, determine, based on the first part of the synchronization signal block, a time domain location for carrying the first indication information, and then receive the first indication information from the network device in step S101 based on the time domain location of the first indication information. When the operating bandwidth of the terminal device is a narrowband, the terminal device may receive the first part of the synchronization signal block based on a relatively small bandwidth, and determine, based on the first part, the time domain location for carrying the first indication information. The first part of the synchronization signal may include a demodulation reference signal (DMRS) used to determine an index of the synchronization signal block, or another signal used to determine the index of the synchronization signal block. This is not limited herein.

For example, the first part of the synchronization signal block may be a DMRS. Before step S101, the terminal device may determine, based on the DMRS, an SSB index corresponding to the synchronization signal block, then determine, based on the SSB index, a transmit beam for receiving the first indication information, and receive the first indication information in step S101 based on the transmit beam.

For another example, the first part of the synchronization signal block may be a DMRS. Before step S101, the terminal device may determine, based on the DMRS, an SSB index corresponding to the synchronization signal block, then determine, based on the SSB index, a resource location for receiving the first indication information, and receive the first indication information in step S101 based on the resource location.

It should be noted that the synchronization channel block in the foregoing example may be an NR SSB. When the operating bandwidth of the terminal device is a narrowband, the terminal device may receive the first part of the SSB based on a relatively small bandwidth, to obtain the DMRS. Therefore, the DMRS in the foregoing example should be understood as a part of the DMRS associated with the PBCH in the SSB. In other words, the DMRS included in the first part of the synchronization signal block is a subset of the DMRS associated with the PBCH in the synchronization signal block.

Figure 6:
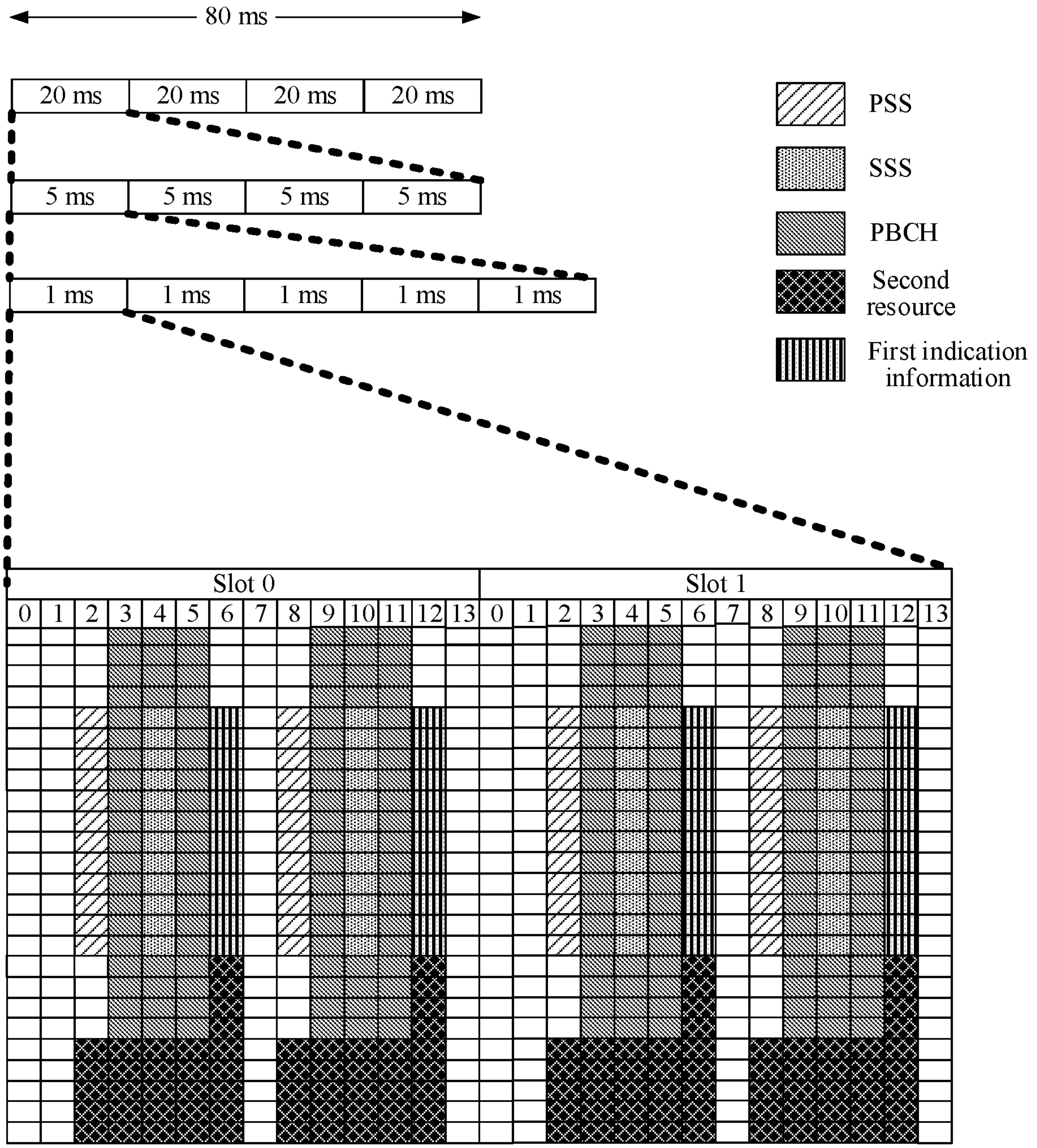
FIG. 6 is another schematic diagram of a radio frame structure according to an embodiment of this application.
Figure 7:
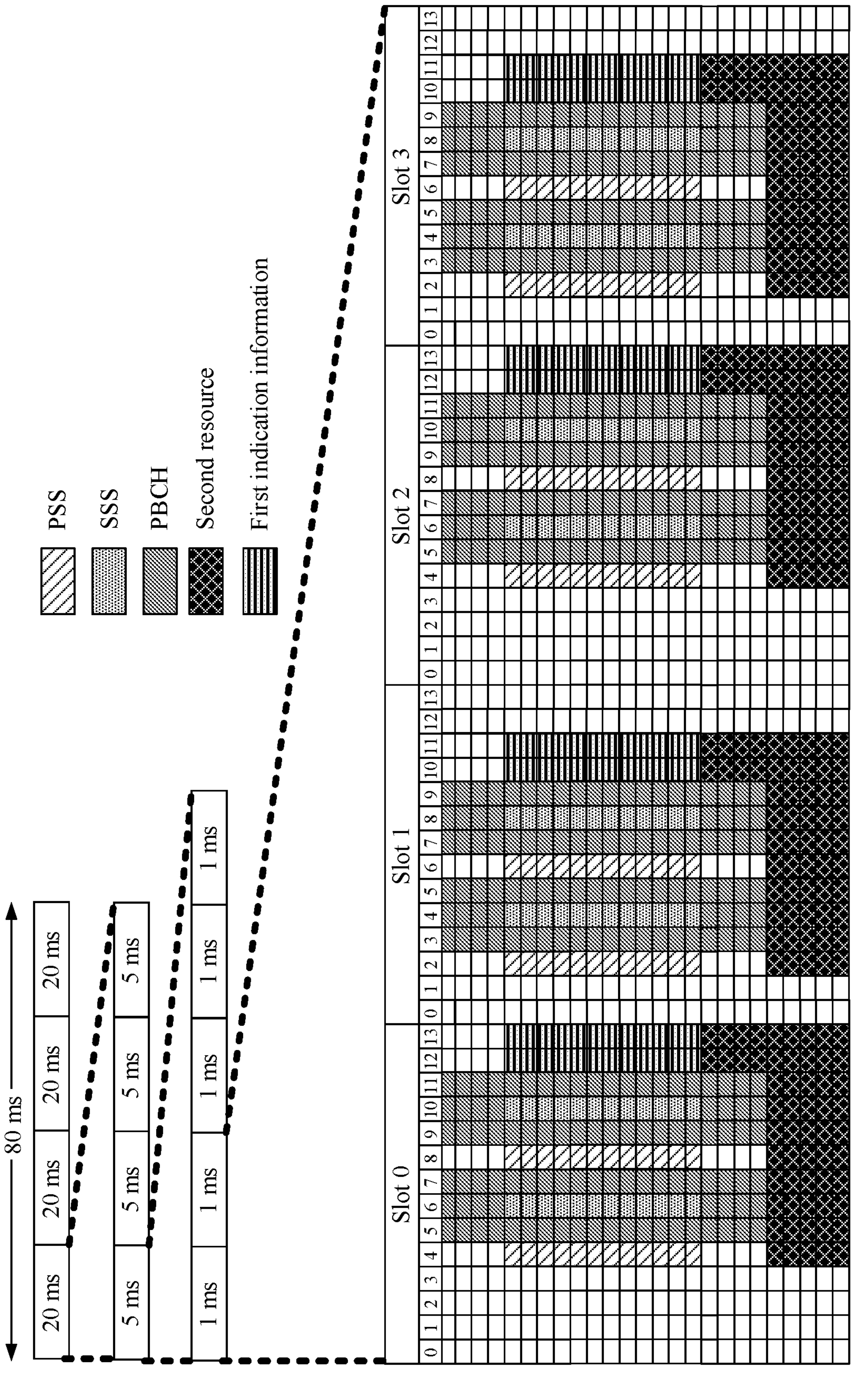
FIG. 7 is another schematic diagram of a radio frame structure according to an embodiment of this application.

With reference to FIG. 6 and FIG. 7, the following describes implementation examples of the manner of carrying the first indication information. It should be noted that, in the examples shown in FIG. 6 and FIG. 7, only an example in which the time domain resource occupied by the first indication information is an adjacent OFDM symbol located after the synchronization signal block in the first slot is used for description. Apparently, the time domain location for carrying the first indication information and a time domain location of the synchronization signal block may not be adjacent OFDM symbols, or the time domain location for carrying the first indication information may be located before the time domain location of the synchronization signal block, or the time domain location for carrying the first indication information may be a plurality of OFDM symbols. This is not limited herein.

For example, there are a plurality of SSB patterns in the NR system. For FR1, there are three patterns: Case A, Case B, and Case C. Generally, the network device may send different SSBs by using different transmit beams. In other words, each SSB corresponds to one transmit beam.

For Case A and Case C, there is an idle symbol located after a time domain resource of the SSB corresponding to each beam. Therefore, the first indication information may be mapped to one or more OFDM symbols located after the SSB corresponding to each beam. FIG. 6 shows an example. In the implementation example shown in FIG. 6, an SSB sending period is 20 ms, and an SSB is located in the first 5 ms in 20 ms. In the example shown in FIG. 6, a subcarrier spacing corresponding to the SSB is 15 kHz. In one SSB sending period, the network device sends a maximum of four SSBs. Each SSB corresponds to one transmit beam, and the time domain resource that carries the first indication information is the $1^{st}$ OFDM symbol located after the SSB corresponding to each beam.

For Case B, SSBs corresponding to every two beams are consecutively arranged, that is, there is no idle symbol in time domain resources of the SSBs corresponding to the two consecutively arranged beams. In this case, the first indication information is mapped to two OFDM symbols located after two SSBs corresponding to every two beams, first indication information carried in the $1^{st}$ OFDM symbol corresponds to the $1^{st}$ beam in the two beams, and first indication information carried in the $2^{nd}$ OFDM symbol corresponds to the $2^{nd}$ beam in the two beams. FIG. 7 shows an example. In the implementation example shown in FIG. 7, an SSB sending period is 20 ms, and an SSB is located in the first 5 ms in 20 ms. In the example shown in FIG. 7, a subcarrier spacing corresponding to the SSB is 30 kHz. In one SSB sending period, the network device sends a maximum of eight SSBs. Each SSB corresponds to one transmit beam, and the first indication information is located on two OFDM symbols located after two consecutively arranged SSBs corresponding to every two beams. The $1^{st}$ OFDM symbol in the two OFDM symbols is first indication information corresponding to the $1^{st}$ SSB in the two consecutively arranged SSBs, and the $2^{nd}$ OFDM symbol in the two OFDM symbols is first indication information corresponding to the $2^{nd}$ SSB in the two consecutively arranged SSBs.

In this embodiment, the relative location indicated by the first indication information sent by the network device in step S101 may be implemented in a plurality of different solutions. The following uses an implementation example to describe in detail the relative location indicated by the first indication information.

In a possible implementation, the first indication information sent by the network device to the terminal device in step S101 may indicate the relative location between the first resource and the second resource. Any network resource (including the first resource and the second resource) includes a time domain resource on a time axis and a frequency domain resource on a frequency axis. Therefore, the relative location, indicated by the first indication information, between the first resource and the second resource may be implemented by using at least one of frequency domain and time domain. In other words, the relative location may be a relative location in frequency domain, a relative location in time domain, or a relative location in time-frequency domain. The following describes different implementations of the relative location by using implementation examples.

1. In step S101, the first indication information sent by the network device indicates a relative frequency domain location between the first resource and the second resource.

In a possible implementation, the relative location indicated by the first indication information sent by the network device in step S101 may indicate a relative location in a dimension of frequency domain. Therefore, after receiving the first indication information in step S101, in addition to determining, through configuration or preconfiguration, the first resource carrying the synchronization signal block, the terminal device may further determine a frequency domain location of the second resource based on the relative frequency domain location between the first resource and the second resource that are indicated by the first indication information, and obtain the second system message at the frequency domain location of the second resource, so that the terminal device is prevented from performing blind detection on different frequency domain resources when the terminal device receives the second system message. This can reduce complexity of receiving the second system message by the terminal device, and can further reduce a delay and power consumption of receiving the second system message by the terminal device and improve communication efficiency.

It should be noted that a frequency domain location relationship between the first resource and the second resource may be implemented in a frequency division multiplexing (FDM) manner. In this case, the first indication information may indicate that the first resource is located at a low frequency location (adjacent to or at an interval of a frequency) of the second resource in frequency domain, or may indicate that the first resource is located at a high frequency location (adjacent to or at an interval of a frequency) of the second resource in frequency domain. In addition, the frequency domain location relationship between the first resource and the second resource may not be implemented in the FDM manner. In this case, the first indication information may indicate that the first resource and the second resource are located at a same frequency domain location in frequency domain, or may indicate that the first resource and the second resource have at least partially the same frequency domain location in frequency domain. This is not limited herein. An implementation example may be described by using FIG. 8.

Figure 8:
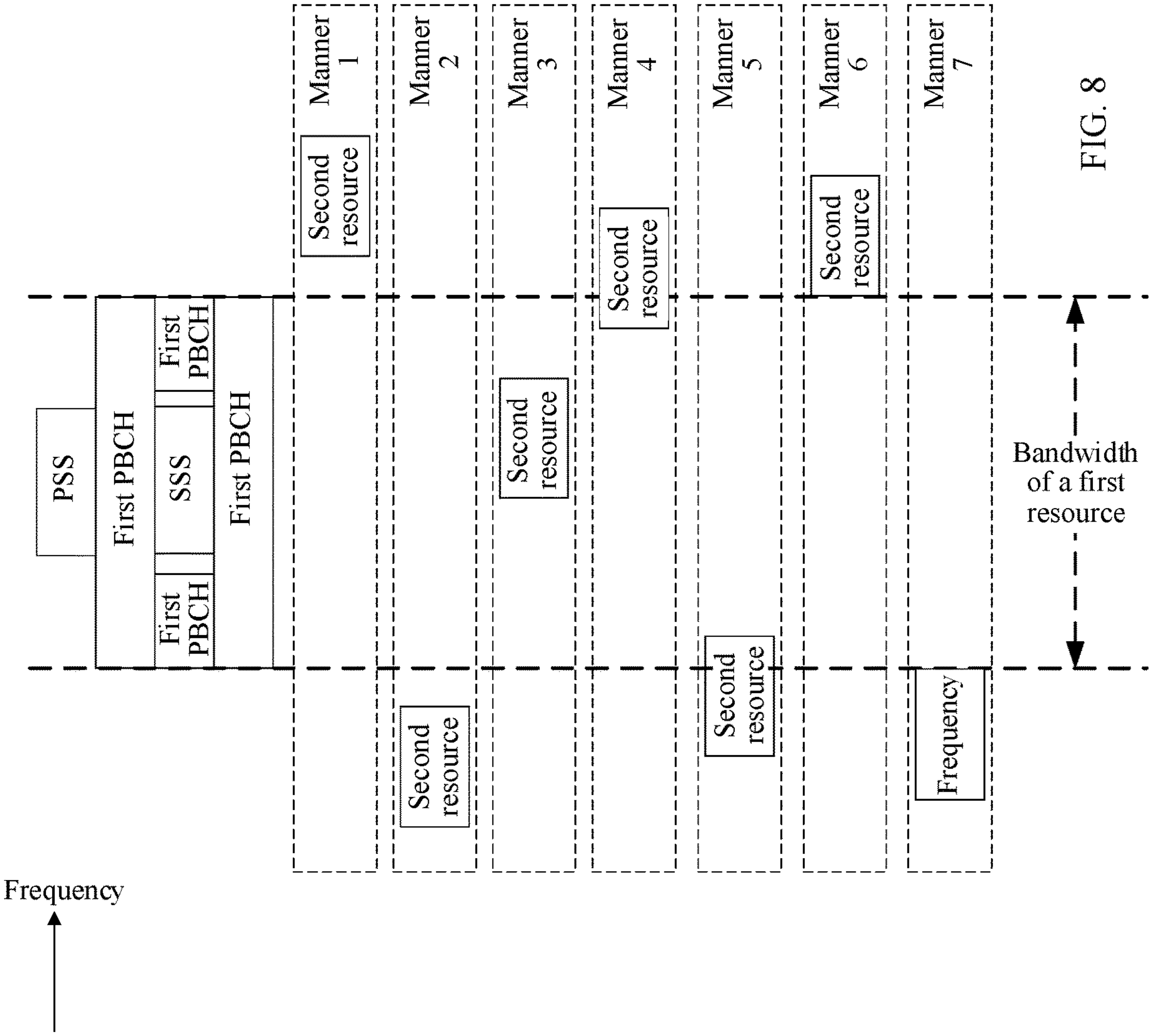
FIG. 8 is another schematic diagram of a radio frame structure according to an embodiment of this application.

FIG. 8 is a schematic diagram of a radio frame structure according to an embodiment of this application. In FIG. 8, a frequency arrow direction indicates a frequency increasing direction. When the first indication information is described only in a dimension of frequency domain, in Manner 1 shown in FIG. 8, the first indication information may indicate that the first resource is located at a low frequency location with frequency separation on the second resource in frequency domain. Alternatively, in Manner 2 shown in FIG. 8, the first indication information may indicate that the first resource is located at a high frequency location with frequency separation on the second resource in frequency domain. Alternatively, in Manner 3 shown in FIG. 8, the first indication information may indicate that, in frequency domain, the first resource is a subset of the second resource. Alternatively, in Manner 4 shown in FIG. 8, the first indication information may indicate that, in frequency domain, a part of the second resource is located at a same frequency domain location as the first resource, and the other part of the second resource is located at a high frequency location of the first resource. Alternatively, in Manner 5 shown in FIG. 8, the first indication information may indicate that apart of the second resource is located at a same frequency domain location as the first resource, and the other part of the second resource is located at a low frequency location of the first resource. Alternatively, in Manner 6 shown in FIG. 8, the first indication information may indicate that the first resource is located at a low frequency location adjacent to the second resource in frequency domain. Alternatively, in Manner 7 shown in FIG. 8, the first indication information may indicate that the first resource is located at a high frequency location adjacent to the second resource in frequency domain. Alternatively, the relative location between the first resource and the second resource in frequency domain is indicated in another manner. This is not limited herein.

In Manner 1 and Manner 2 shown in FIG. 8, because the first resource and the second resource do not have an overlapping frequency domain resource in frequency domain, frequency band utilization may be increased in an FDM manner to improve spectral efficiency. Apparently, the FDM manner may alternatively not be used. This is not limited herein.

Further, in the examples shown in FIG. 6 and FIG. 7, it is considered that the time domain resource that carries the first indication information and the first resource are located in a same slot. Therefore, when the first resource and the second resource are implemented in an FDM manner, FDM processing may also be performed on the time domain resource that carries the first indication information. For example, in time domain, the second resource is a subset of the first resource; or in time domain, the second resource is a subset of a sum of the first resource and the time domain resource that carries the first indication information. Optionally, in time domain, the first resource is a subset of the second resource.

Figure 9:
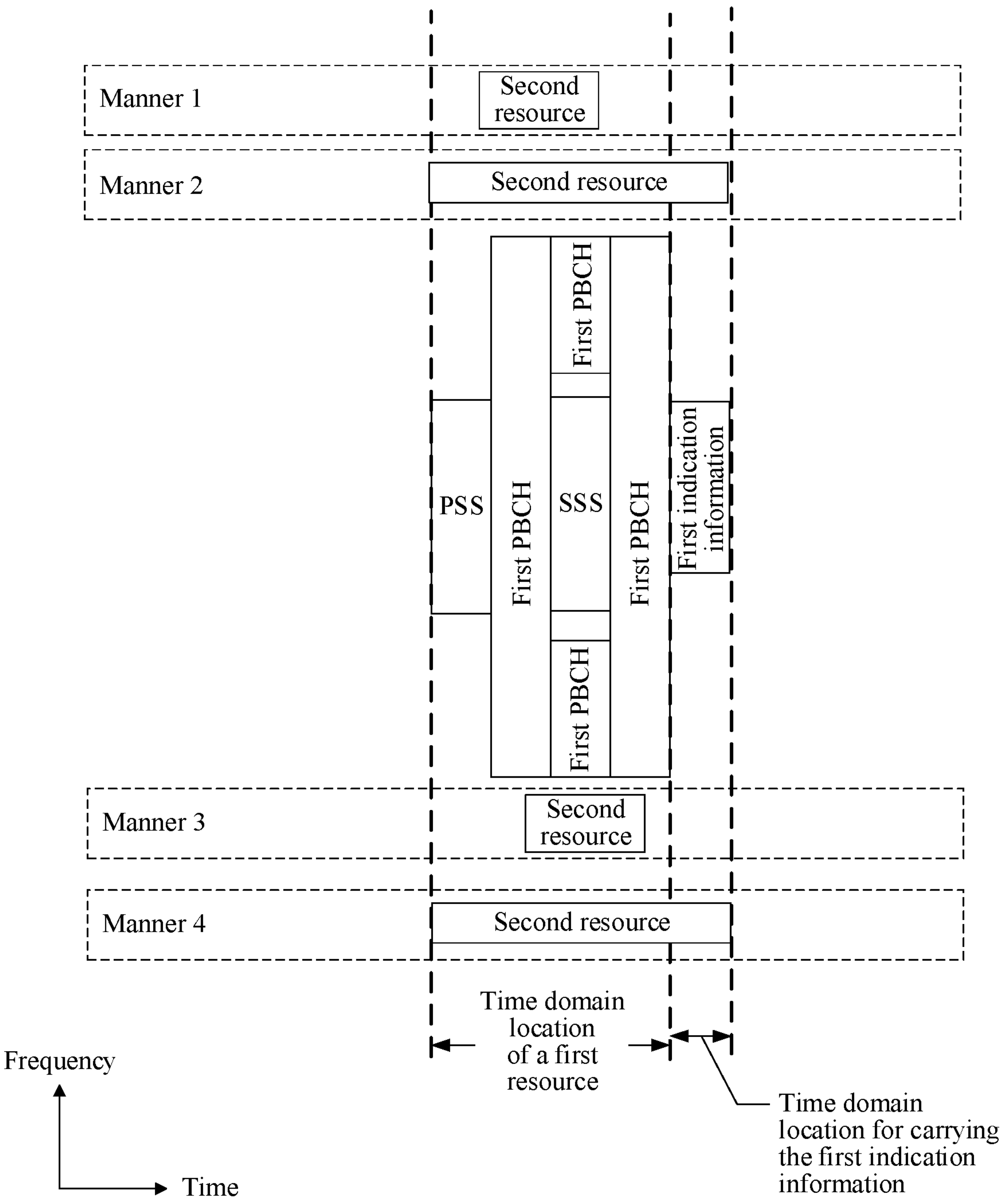
FIG. 9 is another schematic diagram of a radio frame structure according to an embodiment of this application.

As shown in FIG. 9, a frequency arrow direction indicates a frequency increasing direction, and a time arrow direction indicates a time domain location postpone direction.

In Manner 1 shown in FIG. 9, a resource multiplexing manner of the second resource and the first resource is FDM, and the second resource is located at a high frequency location of the first resource in frequency domain. In Manner 3 shown in FIG. 9, a resource multiplexing manner of the second resource and the first resource is FDM, and the second resource is located at a high frequency location of the first resource in frequency domain. In this case, it may be learned that, when the first resource and the second resource are implemented in an FDM manner, in time domain, the second resource is a subset of the first resource.

In Manner 2 shown in FIG. 9, a sum of the first resource, the second resource, and the time domain resource that carries the first indication is implemented in an FDM manner, and the second resource is located at a high frequency location (adjacent to or at an interval of a frequency) of the first resource in time domain. In Manner 4 shown in FIG. 9, a sum of the first resource, the second resource, and the time domain resource that carries the first indication is implemented in an FDM manner, and the second resource is located at a low frequency location (adjacent to or at an interval of a frequency) of the first resource in time domain. In this case, it may be learned that, in time domain, the second resource is a subset of a sum of the first resource and the time domain resource that carries the first indication information; or in time domain, the second resource is a subset of the first resource.

Figure 10:
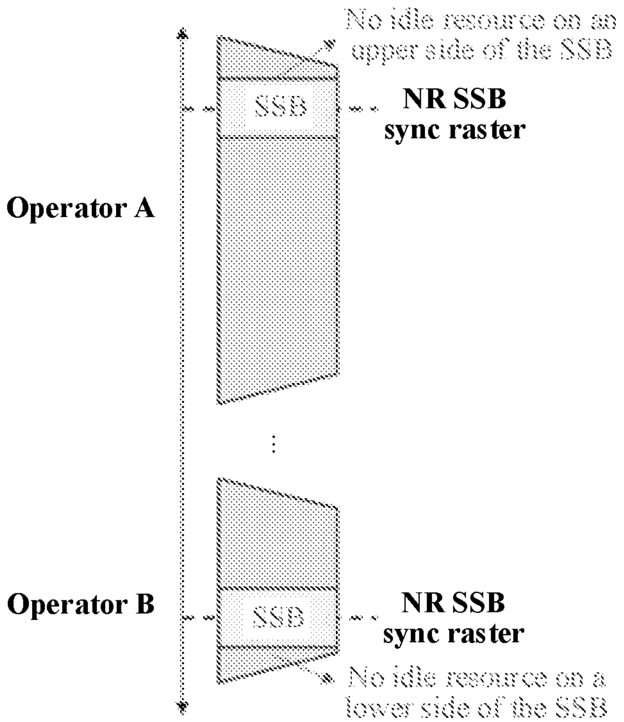
FIG. 10 is another schematic diagram of a radio frame structure according to an embodiment of this application.

In addition, in the FDM manner, before receiving the second system message, the terminal device needs to learn of a location of the second system message in advance, and a frequency center of the NR SSB does not need to be aligned with a carrier center. Therefore, a location of the SSB in the NR system is very flexible, and a location of the SSB in a carrier is very flexible. A location of the second system message relative to the SSB cannot be agreed on in advance. As shown in FIG. 10, it is assumed that there are two operators: an operator A and an operator B. For the operator A, an SSB is located at a high frequency location of a carrier, and there is no idle resource above the high frequency of the SSB. Therefore, the second system message is suitable to be placed at a low frequency location (adjacent to or at an interval of a frequency) of the SSB. For the operator B, an SSB is located at a low frequency location of a carrier, and there is no idle resource above the low frequency of the SSB. Therefore, the second system message is suitable to be placed at a high frequency location (adjacent to or at an interval of a frequency) of the SSB. Different operators have different requirements. Therefore, a deployment location of the second system message needs to be flexible. Otherwise, deployment is limited. Flexible deployment in the FDM manner may be implemented by using the first indication information.

Apparently, compared with a manner in which the network device sends different signals on different time domain resources, a manner in which the network device sends different signals on a same time domain resource or some same time domain resources in an FDM manner can save energy consumption of the network device.

In step S101, when the first indication information sent by the network device indicates the relative frequency domain location between the first resource and the second resource, the first indication information may be implemented in a plurality of different manners. The first indication information carries information by using one or more bits, and indicates the relative frequency domain location between the first resource and the second resource by using different bits. For example, by using a bit “0” (or a bit “00”, “01”, or the like), the first indication information indicates that the first resource is located at a low frequency location (adjacent to or at an interval of a frequency) of the second resource in frequency domain; and by using a different bit “1” (or a bit “10”, “11”, or the like), the first indication information indicates that the first resource is located at a high frequency location (adjacent to or at an interval of a frequency) of the second resource in frequency domain. Alternatively, the first indication information carries information by sending or not sending a sequence. For example, when the network device has a sequence on a time-frequency domain resource that carries first bit information, it indicates that the first resource is located at a low frequency (or high frequency) location (adjacent to or at an interval of a frequency) of the second resource in frequency domain; and when the network device has no sequence on the time-frequency domain resource that carries the first bit information, it indicates that the first resource is located at the high frequency (or low frequency) location (adjacent to or at an interval of a frequency) of the second resource in frequency domain. Alternatively, the first indication information carries information by using different sequences, for example, a first sequence and a second sequence. Alternatively, another implementation is used. This is not limited herein An example in which the first indication information carries information by using different sequences is used below for description.

In a possible implementation, when a signal sequence that carries the first indication information is a first sequence, the first indication information indicates that the first resource is located at a low frequency location (adjacent to or at an interval of a frequency) of the second resource in frequency domain; or when the signal sequence that carries the first indication information is a second sequence, the first indication information indicates that the first resource is located at a high frequency location (adjacent to or at an interval of a frequency) of the second resource in frequency domain, where the first sequence is different from the second sequence. When the first indication information indicates the relative location between the first resource and the second resource in a dimension of frequency domain, the first indication information may carry different sequences to indicate the relative location. For example, the first sequence indicates that the first resource is located at the low frequency location (adjacent to or at an interval of a frequency) of the second resource in frequency domain, and the second sequence different from the first sequence indicates that the first resource is located at the high frequency location (adjacent to or at an interval of a frequency) of the second resource in frequency domain.

It should be noted that the first sequence or the second sequence may be one of a ZC sequence, a Gold sequence, a Frank sequence, a Golay complementary sequence, an m sequence, an M sequence, a Hadamard sequence, and a Walsh sequence, or may be a product of two or more of the foregoing sequences, or may be a sequence of another type. This is not limited herein.

The following uses the Gold sequence as an example to provide a design example of the first indication information.

A manner of generating the Gold sequence in the NR system is as follows:

A length of the Gold sequence is denoted as $M_{PN}$, where n=0, 1, . . . , $M_{PN}-1$, and an element c(n) of the Gold sequence may be represented as follows:

$$c(n)=(x_1(n+N_C)+x_2(n+N_C))\bmod 2$$

$$x_1(n+31)=(x_1(n+3)+x_1(n))\bmod 2$$

$$x_2(n+31)=(x_2(n+3)+x_2(n+2)+x_2(n+1)+x_2(n))\bmod 2$$

Herein, $N_C=1600$, an initialization seed of the 1st m-sequence meets $x_1(0)=1$, $x_1(n)=0$, n=1, 2, . . . , 30, and an initialization seed of the 2nd m-sequence is represented $$\text{as } c_{init}=\sum_{i=0}^{30} x_2(i)\cdot 2^i.$$

It can be learned from the generation formula of the Gold sequence that the initialization seed of the 1st m-sequence is fixed, and only the initialization seed of the 2nd m-sequence needs to be designed.

Example 1

The signal sequence that carries the first indication information is the Gold sequence, and an initialization seed of the sequence is the same as an initialization seed of a sequence corresponding to a DMRS associated with an NR PBCH. In other words, the signal sequence that carries the first indication information is generated based on the initialization seed. The initialization seed $c_{init}$ meets:

$$c_{init}=2^{11}(\bar{i}_{SSB}+1)(\lfloor N_{ID}^{cell}/4\rfloor+1)+2^6(\bar{i}_{SSB}+1)+(N_{ID}^{cell} \bmod 4).$$

Herein, $$N_{ID}^{cell}$$

is a cell identity; and c(•) is the Gold sequence generated by using the initialization seed $c_{init}$.

When a maximum of four beams are used to send an SSB, $\bar{i}_{SSB}=i_{SSB}+4n_{hf}$, where a value 0 of $n_{hf}$ indicates the 1st half-frame in one frame, a value 1 of $n_{hf}$ indicates the 2nd half-frame in one frame, and $i_{ssb}$ is two least significant bits in an SSB index.

When a maximum of eight beams or 64 beams are used to send an SSB, $\bar{i}_{SSB}=i_{SSB}$, where $i_{ssb}$ is three least significant bits in an SSB index.

$$r(m)=\frac{1}{\sqrt{2}}(1-2\cdot c(2m))+j\frac{1}{\sqrt{2}}(1-2\cdot c(2m+1)).$$

Herein, r(0), . . . , and r(143) is a sequence used by the NR PBCH DMRS, and m in the foregoing formula is a number of an element in the sequence.

Figure 11:
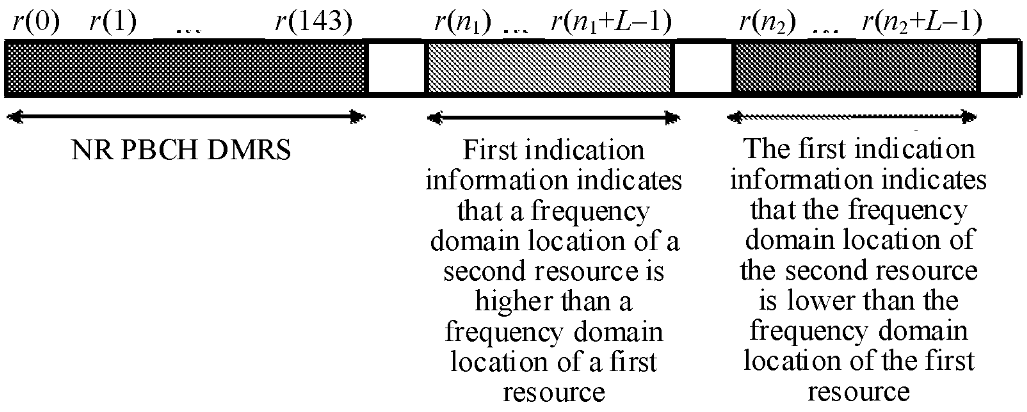
FIG. 11 is another schematic diagram of a radio frame structure according to an embodiment of this application.

In this case, it is assumed that a sequence length of the first indication information is L; r(n1), r(n1+1), . . . , and r(n1+L−1) represent a state 1; and r(n2), r(n2+1), . . . , and r(n2+L−1) represent a state 2, where n2 meets n2>n1+L, and n1 meets n1>143. FIG. 11 shows an example. When the sequence of the first indication information represents the state 1, the first indication information indicates that the first resource is located at a low frequency location (adjacent to or at an interval of a frequency) of the second resource in frequency domain; and when the sequence of the first indication information represents the state 2, the first indication information indicates that the first resource is located at a high frequency location (adjacent to or at an interval of a frequency) of the second resource in frequency domain.

Example 2

The signal sequence that carries the first indication information is the Gold sequence. An initialization seed $c_{init}$ of the sequence is determined based on at least one of an SSB index, a cell identity, a status indication value of the first indication information, a half-frame number, a frame number, and a slot number. The SSB index is a number of a transmit beam corresponding to an SSB. In other words, the signal sequence that carries the first indication information is generated based on the initialization seed. The initialization seed $c_{init}$ meets the following:

$$c_{init}=2^{A1}(B1*i_{API}+k1)+2^{11}(\bar{i}_{SSB}+1)(\lfloor N_{ID}^{cell}/4\rfloor+1)+2^6(\bar{i}_{SSB}+1)+(N_{ID}^{cell} \bmod 4).$$

Herein, A1 is a positive integer greater than 11, B1 is a positive integer, and k1 is a non-negative integer. For example, A1 is 22, B1 is 1, and k1 is 1.

Alternatively, the signal sequence that carries the first indication information is generated based on the initialization seed. The scrambling code initialization seed $c_{init}$ meets the following:

$$c_{init}=2^{A2}(B2*i_{API}+k2)(B3*\bar{i}_{SSB}+k3)(B4*\lfloor N_{ID}^{cell}/4\rfloor+k4)+2^6(\bar{i}_{SSB}+1)+N_{ID}^{cell} \bmod 4).$$

Herein, A2 is a positive integer greater than 6, B2 is a positive integer, and B3, k3, B4, and k4 are non-negative integers. For example, A2 is 22, B2 is 1, k2 is 1, B3 is 0 or 1, B4 is 0 or 1, k3 is 0 or 1, and k4 is 0 or 1.

Herein, $$N_{ID}^{cell}$$

is the cell identity; c(•) is the Gold sequence generated by using the initialization seed $c_{init}$; and $i_{API}$ is a status indication value of the first indication information. For example, a value 0 indicates that the first resource is located at a low frequency location (adjacent to or at an interval of a frequency) of the second resource in frequency domain; and a value 1 indicates that the first resource is located at a high frequency location (adjacent to or at an interval of a frequency) of the second resource in frequency domain.

When a maximum of four beams are used to send an SSB, $\bar{i}_{SSB}=i_{SSB}+4n_{hf}$, where a value 0 of $n_{hf}$ indicates the 1st half-frame in one frame, a value 1 of $n_{hf}$ indicates the 2nd half-frame in one frame, and $i_{ssb}$ is two least significant bits in an SSB index.

When a maximum of eight beams or 64 beams are used to send an SSB, $\bar{i}_{SSB}=i_{SSB}$, where $i_{ssb}$ is three least significant bits in an SSB index.

Example 3

The signal sequence that carries the first indication information is the Gold sequence. An initialization seed $c_{init}$ of the sequence is determined based on a cell identity and a status indication value of the first indication information. In other words, the signal sequence that carries the first indication information is generated based on the initialization seed. The initialization seed $c_{init}$ meets the following:

$$c_{init} = 2^{A3}(B5 * i_{API} + k5)\left(B6 * \lfloor N_{ID}^{cell}/4 \rfloor + k6\right) + 2^{A4}(B7 * i_{API} + k7) + \left(N_{ID}^{cell} \bmod 4\right).$$

Herein, A3 and A4 are non-negative integers, one of A3 and A4 is a non-zero value, and B5, k5, B6, k6, B7, and k7 are non-negative integers. For example, A3 is 11, B5 is 0 or 1, k5 is 0 or 1, B6 is 0 or 1, B7 is 0 or 1, k6 is 0 or 1, and k7 is 0 or 1.

Herein, $$N_{ID}^{cell}$$

is the cell identity; and c(•) is the Gold sequence generated by using the initialization seed $c_{init}$.

In addition, $i_{API}$ is a status indication value of the first indication information. For example, a value 0 indicates that the first resource is located at a low frequency location (adjacent to or at an interval of a frequency) of the second resource in frequency domain; and a value 1 indicates that the first resource is located at a high frequency location (adjacent to or at an interval of a frequency) of the second resource in frequency domain.

2. In step S101, the first indication information sent by the network device indicates a relative time domain location between the first resource and the second resource.

In a possible implementation, the relative location indicated by the first indication information sent by the network device in step S101 may indicate the relative time domain location between the first resource and the second resource. The relative location indicated by the first indication information may indicate a relative location in a dimension of time domain. In addition to determining, through configuration or preconfiguration, the first resource carrying the synchronization signal block, the terminal device may further determine a time domain location of the second resource based on the relative time domain location between the first resource and the second resource that are indicated by the first indication information, and obtain the second system message at the time domain location of the second resource, so that the terminal device is prevented from performing blind detection on different time domain resources when the terminal device receives the second system message. This can reduce complexity of receiving the second system message by the terminal device, and can further reduce a delay and power consumption of receiving the second system message by the terminal device and improve communication efficiency.

It should be noted that a time domain location relationship between the first resource and the second resource may be implemented in a time division multiplexing (TDM) manner. In this case, in time domain, the first resource and the second resource are adjacent or are spaced by a quantity of OFDM symbols, and the first indication information may indicate that the time domain location of the first resource is located after the time domain location of the second resource, or may indicate that the time domain location of the first resource is located before the frequency domain location of the second resource. In addition, the time domain location relationship between the first resource and the second resource may not be implemented in the TDM manner. In this case, the first indication information may indicate that the time domain location of the first resource is the same as the time domain location of the second resource, or may indicate that the time domain location of the first resource is at least partially the same as the time domain location of the second resource. This is not limited herein.

Further, in frequency domain, the second resource may be a subset of the first resource. The first resource and the second resource may be implemented in a TDM manner. For example, in frequency domain, the second resource is the subset of the first resource. In this way, when the bandwidth of the terminal device is a narrowband, the terminal device receives different signals on a same frequency domain resource or some same frequency domain resources in a TDM manner. Compared with a manner in which the terminal device receives different signals on different frequency domain resources through radio frequency (RF) switching, this helps the narrowband terminal device quickly receive different signals, and saves energy consumption of the terminal device. An implementation example may be described in FIG. 12.

Figure 12:
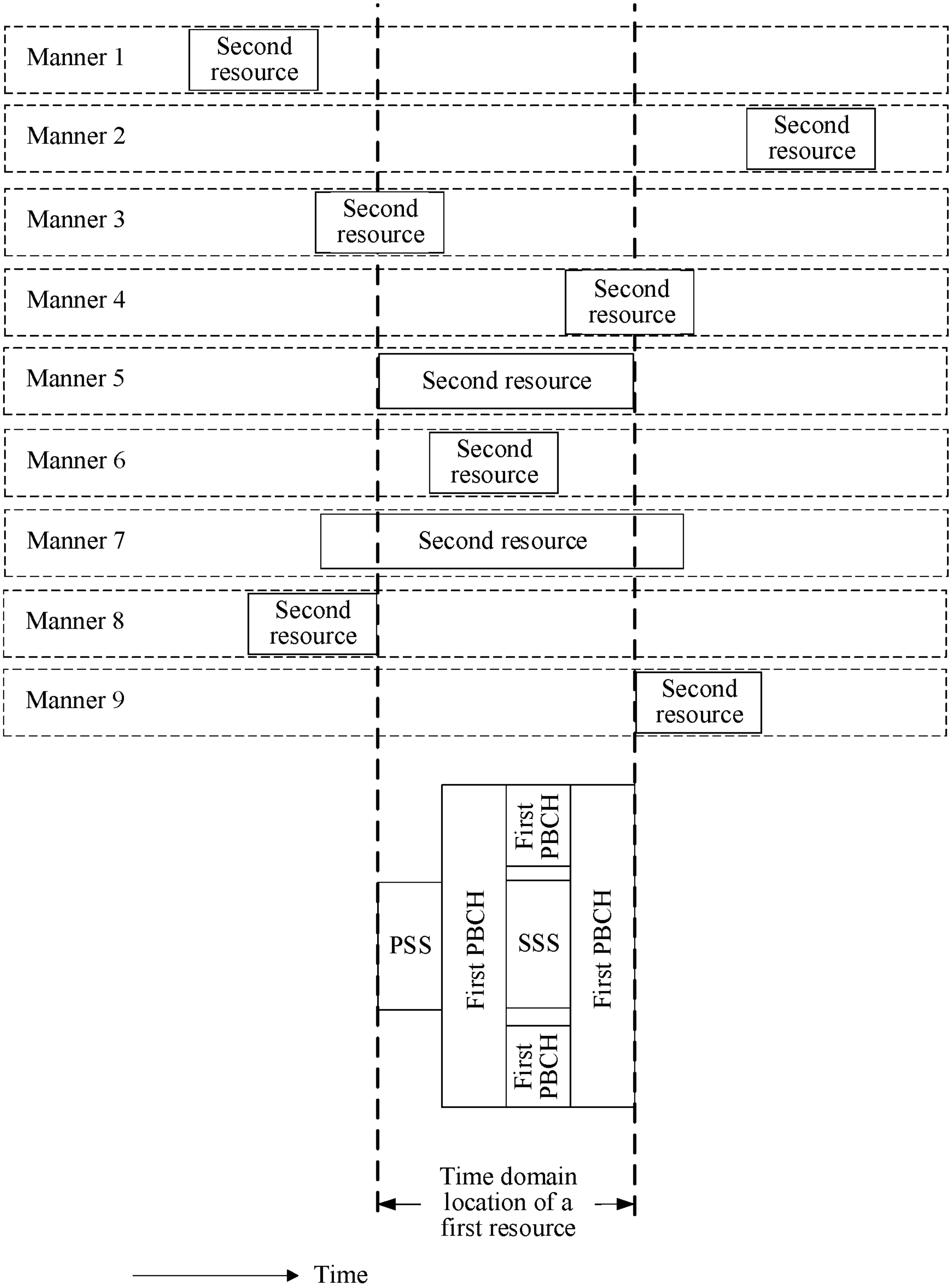
FIG. 12 is another schematic diagram of a radio frame structure according to an embodiment of this application.

FIG. 12 is a schematic diagram of a radio frame structure according to an embodiment of this application. In FIG. 12, a time arrow direction indicates a time domain location postpone direction. When the first indication information is described only in a dimension of time domain, in Manner 1 shown in FIG. 12, the first indication information may indicate that the time domain location of the first resource is located after the time domain location of the second resource, and the first resource and the second resource are not located in adjacent time domain locations, that is, there is an OFDM symbol between the first resource and the second resource. Alternatively, in Manner 2 shown in FIG. 12, the first indication information may indicate that the time domain location of the first resource is located before the time domain location of the second resource, and the first resource and the second resource are not located in adjacent time domain locations, that is, there is an OFDM symbol between the first resource and the second resource. Alternatively, in Manner 3 shown in FIG. 12, the first indication information may indicate that the time domain location of the second resource overlaps a maximum time domain location corresponding to the first resource. Alternatively, in Manner 4 shown in FIG. 12, the first indication information may indicate that the time domain location of the second resource overlaps a minimum time domain location corresponding to the first resource. Alternatively, in Manner 5 shown in FIG. 12, the first indication information may indicate that the time domain location of the second resource is the same as the time domain location of the first resource. Alternatively, in Manner 6 shown in FIG. 12, the first indication information may indicate that the second resource is a subset of the first resource in time domain. Alternatively, in Manner 7 shown in FIG. 12, the first indication information may indicate that the first resource is a subset of the second resource in time domain. Alternatively, in Manner 8 shown in FIG. 12, the first indication information may indicate that the time domain location of the first resource is located after the time domain location of the second resource, and the first resource and the second resource are located in adjacent time domain locations, that is, there is no OFDM symbol between the first resource and the second resource. Alternatively, in Manner 9 shown in FIG. 12, the first indication information may indicate that the time domain location of the first resource is located before the time domain location of the second resource, and the first resource and the second resource are located in adjacent time domain locations, that is, there is no OFDM symbol between the first resource and the second resource. Alternatively, the relative location between the first resource and the second resource in time domain is indicated in another manner. This is not limited herein.

In step S101, when the first indication information sent by the network device indicates the relative time domain location between the first resource and the second resource, the first indication information may be implemented in a plurality of different manners. The first indication information carries information by using one or more bits, and the relative time domain location between the first resource and the second resource are respectively indicated by using different bits. For example, by using a bit "0" (or a bit "00", "01", or the like), the first indication information indicates that the time domain location of the first resource is located after the time domain location of the second resource; and by using a different bit "1" (or a bit "10", "11", or the like), the first indication information indicates that the time domain location of the first resource is located before the time domain location of the second resource. Alternatively, the first indication information carries information by sending or not sending a sequence. For example, when the network device has a sequence on a time-frequency domain resource that carries first bit information, it indicates that the time domain location of the first resource is located after (or before) the time domain location of the second resource; and when the network device has no sequence on the time-frequency domain resource that carries the first bit information, it indicates that the time domain location of the first resource is located before (or after) the time domain location of the second resource. Alternatively, the first indication information carries information by using different sequences, for example, a third sequence and a fourth sequence. Alternatively, another implementation is used. This is not limited herein When the signal sequence that carries the first indication information is the third sequence, the first indication information may indicate that the time domain location of the first resource is located after the time domain location of the second resource; and when the signal sequence that carries the first indication information is the fourth sequence, the first indication information indicates that the time domain location of the first resource is located before the time domain location of the second resource, where the third sequence is different from the fourth sequence. For an implementation processes of the third sequence and the fourth sequence, refer to the descriptions of the first sequence and the second sequence. Details are not described herein again.

In addition, in step S101, the first indication information sent by the network device indicates a relative time-frequency domain location between the first resource and the second resource, that is, the first indication information indicates the relative location between the first resource and the second resource in both time domain and frequency domain. In this case, to reduce signaling consumption of the network device, both the relative frequency domain location and the relative time domain location may be indicated in a same implementation of the first indication information. Apparently, the network device may add a plurality of sequences to the first indication information, and the relative time domain location and the relative frequency domain location are indicated by using different sequences. This is not limited herein.

For example, the first indication information carries information by using one or more bits, and indicates the relative frequency domain location between the first resource and the second resource by using different bits. For example, by using a bit "0" (or a bit "00", "01", or the like), the first indication information indicates that the first resource is located at a low frequency location (adjacent to or at an interval of a frequency) of the second resource in frequency domain, and indicates that the time domain location of the first resource is located after the time domain location of the second resource; and by using a different bit "1" (or a bit "10", "11", or the like), the first indication information indicates that the first resource is located at a high frequency location (adjacent to or at an interval of a frequency) of the second resource in frequency domain, and indicates that the time domain location of the first resource is located before the time domain location of the second resource. Alternatively, the first indication information carries information by sending or not sending a sequence. For example, when the network device has a sequence on a time-frequency domain resource that carries first bit information, it indicates that the first resource is located at a low frequency (or high frequency) location (adjacent to or at an interval of a frequency) of the second resource in frequency domain, and indicates that the time domain location of the first resource is located after the time domain location of the second resource; and when the network device has no sequence on the time-frequency domain resource that carries the first bit information, it indicates that the first resource is located at the high frequency (or low frequency) location (adjacent to or at an interval of a frequency) of the second resource in frequency domain, and indicates that the time domain location of the first resource is located before the time domain location of the second resource. Alternatively, the first indication information carries information by using different sequences. Alternatively, another implementation is used. This is not limited herein An example in which the first indication information carries information by using different sequences is still used herein for description.

The third sequence may be the same as the first sequence, and the fourth sequence may be the same as the second sequence. For example, the first indication information indicates the relative location between the first resource and the second resource in two dimensions: frequency domain and time domain. In this case, the first indication information may indicate that the time domain location of the first resource is located after the time domain location of the second resource, and the first resource is located at a low frequency location (adjacent to or at an interval of a frequency) of the second resource in frequency domain; or the first indication information may indicate that the time domain location of the first resource is located before the frequency domain location of the second resource, and the first resource is located at a high frequency location (adjacent to or at an interval of a frequency) of the second resource in frequency domain.

For another example, the third sequence is the same as the second sequence, and the fourth sequence is the same as the first sequence. For example, the first indication information indicates the relative location between the first resource and the second resource in two dimensions: frequency domain and time domain. In this case, the first indication information may indicates that the time domain location of the first resource is located after the time domain location of the second resource, and the first resource is located at a high frequency location (adjacent to or at an interval of a frequency) of the second resource in frequency domain; or the first indication information may indicate that the time domain location of the first resource is located before the frequency domain location of the second resource, and the first resource is located at a low frequency location (adjacent to or at an interval of a frequency) of the second resource in frequency domain.

In a possible implementation, the first system message in the synchronization signal block carried in the first resource is a first MIB carried on a first PBCH, and the second system message carried in the second resource is a second MIB carried on a second PBCH. The first system message may be the first MIB carried on the PBCH in the synchronization signal block, and the second system message may be the second MIB carried on the second PBCH, where the first PBCH is different from the second PBCH.

Optionally, the first MIB is the same as the second MIB. Because the first MIB and the second MIB are respectively used for terminal devices with different operating bandwidths, and the first MIB may be the same as the second MIB, the network device configures a same MIB for the terminal devices with different operating bandwidths. Compared with a manner in which the network device configures different MIBs for the terminal devices with different operating bandwidths, this can reduce signaling consumption of the network device.

It should be noted that, that the first MIB is the same as the second MIB herein means that an information bit corresponding to the first MIB is the same as an information bit corresponding to the second MIB. A first complex symbol obtained after modulation and encoding of the first MIB is mapped to the first resource, a second complex symbol obtained after modulation and encoding of the second MIB is mapped to the second resource, and the second complex symbol is a subset of the first complex symbol. The following uses FIG. 13 and FIG. 14 as implementation examples for description.

Figure 13:
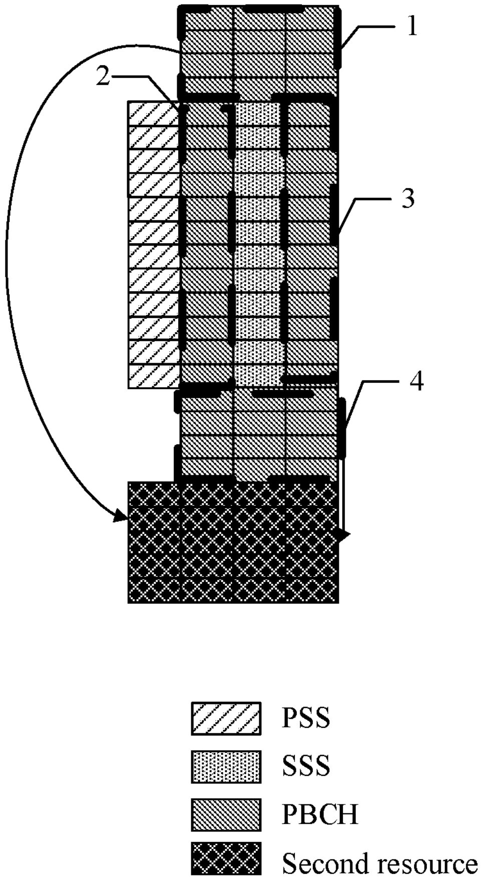
FIG. 13 is another schematic diagram of a radio frame structure according to an embodiment of this application.

FIG. 13 is a schematic diagram of a radio frame structure according to an embodiment of this application. An example in which a resource multiplexing manner for the first resource and the second resource is FDM is used for description. For example, the first MIB carried in the first resource includes a part 1, a part 2, a part 3, and a part 4. It is assumed that a terminal device with a relatively small operating bandwidth can completely receive the part 2 and the part 3 whose bandwidths each are approximate to a PSS/SSS. In this case, the network device may replicate the part 1 and the part 4 in the first MIB, and add the part 1 and the part 4 that are obtained through replication to the second resource.

Figure 14:
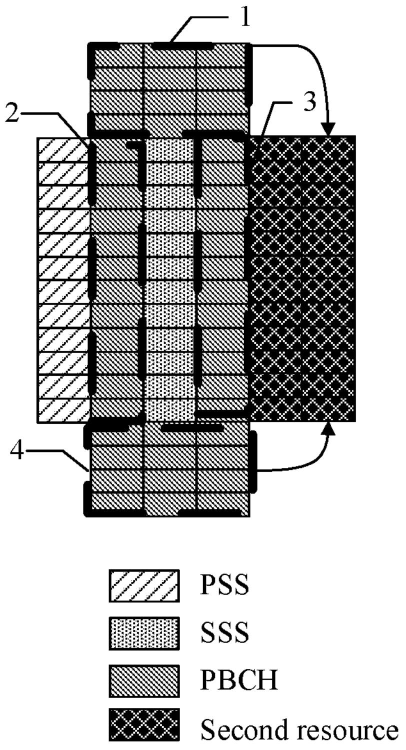
FIG. 14 is another schematic diagram of a communication method according to an embodiment of this application.

FIG. 14 is a schematic diagram of a radio frame structure according to an embodiment of this application. An example in which a resource multiplexing manner for the first resource and the second resource is TDM is used for description. For example, the first MIB carried in the first resource includes a part 1, a part 2, a part 3, and a part 4. It is assumed that a terminal device with a relatively small operating bandwidth can completely receive the part 2 and the part 3 whose bandwidths each are approximate to a PSS/SSS. In this case, the network device may replicate the part 1 and the part 4 in the first MIB, and add the part 1 and the part 4 that are obtained through replication to the second resource.

In a possible implementation, the first MIB is different from the second MIB, and the terminal device with a relatively small operating bandwidth obtains a part of the first system message MIB and the second system message respectively on the first resource and the second resource, and combines the part of the first system message MIB and the second system message MIB to obtain a complete MIB. For example, in this case, the second MIB needs to carry only some narrowband-specific differentiated information, and does not need to carry a system frame number. The terminal device with a relatively small operating bandwidth may obtain the system frame number by using the part of the first MIB.

In a possible implementation, when the first MIB is different from the second MIB, in step S102, the terminal device with a relatively small operating bandwidth obtains the second system message only on the second resource, and does not need to obtain the first system message on the first resource. For example, in this case, the second MIB carries all parameters required for network accessing, including the system frame number, and the system frame number does not need to be obtained based on the first MIB.

In a possible implementation, in step S101, a transmit beam of the first indication information is the same as a transmit beam of the synchronization signal block. For example, in step S101, the network device sends the first indication information and the synchronization signal block by using a same transmit beam, so that channel information is obtained based on the synchronization signal block, and is applied to detection of the first indication information. This improves detection performance of the first indication information.

In a possible implementation, the first indication information is carried in downlink control information (DCI), a cyclic redundancy check (CRC) corresponding to the DCI is scrambled by using a first identifier, and the first identifier is a preset value, or the first identifier is determined based on a cell identity corresponding to the synchronization signal block. The first identifier may include one or more of a radio network temporary identifier (RNTI), a group radio network temporary identifier (G-RNTI), a cell RNTI (C-RNTI), or another identifier. This is not limited herein. The first indication information may carry information by using one or more bits. For example, the first indication information may carry information by using a field in the DCI.

For example, when the first identifier is the preset value, the first identifier may be configured as a value in hexadecimal numbers 0000 to FFFF. When the first identifier is determined by using the cell identity corresponding to the synchronization signal block, the cell identity corresponding to the synchronization signal block is A, a hexadecimal number corresponding to A is B, and the first identifier meets C+B, where C may be an agreed value in the hexadecimal numbers 0000 to FFFF.

In a possible implementation, the first indication information further indicates that the second system message is sent. In addition to indicating the relative location between the first resource and the second resource, the first indication information may further indicate that the second system message is sent by the network device. When the time domain location for carrying the first indication information is located before the second resource, the first indication information may indicate that the second system message is to be sent by the network device. When the time domain location for carrying the first indication information is in the second time domain, the first indication information may indicate that the second system message is to be sent by the network device.

The first indication information may further indicate whether to send the second system message, so as to avoid a power consumption increase caused by blind receiving of the second system message by the narrowband terminal. In other words, when the network device does not send the second system message, if the terminal device does not receive the first indication information, the narrowband terminal blindly receives the second system message, and consequently power consumption of the narrowband terminal increases. An indication manner may have different implementations.

For example, in an implementation, the network device sends or does not send the first indication information to indicate whether to send the second system message. When the network device performs step S101, that is, when the network device sends the first indication information, it indicates that the second system message is sent by the network device. When the network device does not perform step S101, that is, when the network device does not send the first indication information, it indicates that the second system message is not sent by the network device. Correspondingly, in step S101, the narrowband terminal learns, by detecting or not detecting the first indication information, whether the network device sends the second system message. If the first indication information is detected, the narrowband terminal receives the second system message. If the first indication information is not detected, the narrowband terminal does not receive the second system message.

In another implementation, the network device definitely sends the first indication information in step S101, and different states of the first indication information indicate whether to send the second system message. For example, two sequences are used. If a sequence for sending the first indication information is a sequence 1, it indicates that the network device sends the second system message. If a sequence for sending the first indication information is a sequence 2, it indicates that the network device does not send the second system message. Alternatively, one bit is used. If a value of a bit for sending the first indication information is 1, it indicates that the network device sends the second system message. If a value of a bit for sending the first indication information is 0, it indicates that the network device does not send the second system message.

In addition, there may be another manner in which the first indication information indicates whether to send the second system message. For example, refer to the foregoing plurality of implementations of the relative frequency domain location. This is not specifically limited herein.

In a possible implementation, the first indication information further indicates whether the terminal device listens to one or more paging occasions (PO) located after the time domain location of the first indication information. In addition to indicating the relative location between the first resource and the second resource, the first indication information may be further used by the terminal device to determine whether to listen to the one or more POs located after the first indication information. Compared with a manner in which the terminal device blindly listens to a PO, this can avoid a waste of power consumption caused when blind detection performed by the terminal device fails.

The first indication information may further indicate whether to listen to one or more POs located after the SSB corresponding to the first indication information. This can avoid unnecessary paging receiving, and further reduce power consumption.

Figure 15:
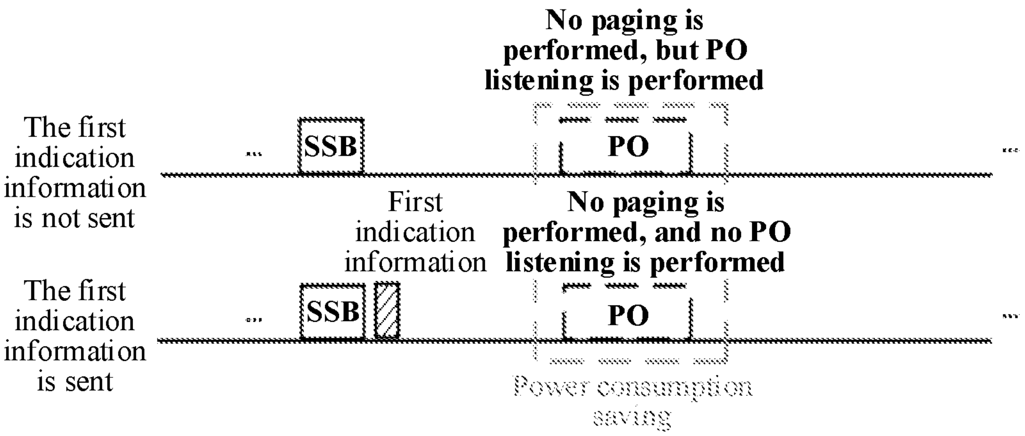
FIG. 15 is another schematic diagram of a radio frame structure according to an embodiment of this application.

In FIG. 15, if the first indication information is not sent, the terminal device needs to listen to each PO. The terminal device learns that there is no paging information of the terminal device only after listening to the PO and detecting no physical downlink control channel (PDCCH) or detecting no PDSCH including an identifier of the terminal device. Herein, unnecessary paging receiving exists, and power consumption is wasted.

In FIG. 15, if the first indication information is sent, it can be learned from the foregoing content that the first indication information indicates the relative location between the first resource that carries an SSB and the second resource. In this case, the first indication information indicates whether the terminal device listens to a subsequent PO of the SSB, and the terminal device may learn in advance whether paging is performed. If the first indication information indicates that no paging is performed, the terminal device may not listen to the PO. This can reduce power consumption.

In addition, the first indication information indicates a relatively small amount of information, and a relatively small quantity of resources are required. Power consumption of detecting the first indication information by the terminal device is lower than PO detection power consumption. Therefore, the first indication information indicates whether a power consumption gain exists in PO listening. For an indication manner, refer to the foregoing plurality of different implementations of the first indication information. For example, whether paging exists may be indicated by sending or not sending the first indication information, or whether paging exists may be indicated by using different states of the first indication information. For details, refer to the plurality of possible implementations of the first indication information. Details are not described herein again.

In a possible implementation, the first indication information further indicates whether a third system message of the terminal device is updated.

Optionally, the third system message includes at least one of the second system message and the first system message.

Optionally, the third system message is different from the second system message, and the third system message is different from the first system message.

In addition to indicating the relative location between the first resource and the second resource, the first indication information may further indicate whether the third system message of the terminal device is updated, and system information is read only when the system information needs to be updated. This reduces unnecessary system information reading and reduces power consumption of the terminal device.

For example, when the first indication information indicates whether a system message changes, for example, the first indication information may indicate a value tag, a terminal device with a relatively small operating bandwidth (denoted as a narrowband terminal) stores the system information after reading the system information, where the stored system information corresponds to one value tag. If the system information changes at a moment, a value of the value tag increases by one. In this manner, the narrowband terminal may first obtain the value tag, and compare the value tag with the previously stored value tag. If the value changes, it indicates that the system information changes, and the narrowband terminal needs to receive updated system information. If the value does not change, it indicates that the system information does not change, and the narrowband terminal does not need to receive the system information. The information is notified in the first indication information, so that the narrowband terminal can learn in time whether the system information changes, and read the system information only when the system information changes. This reduces unnecessary system information reading and reduces power consumption of the narrowband terminal.

In a possible implementation, the first indication information further indicates whether the terminal device is allowed to select, during cell selection/reselection, a cell that has a same frequency as a barred cell. In addition to indicating the relative location between the first resource and the second resource, the first indication information may further indicate whether the terminal device is allowed to select, during cell selection/reselection, the cell that has the same frequency as the barred cell. Therefore, a quantity of cells selected/reselected by the terminal device can be reduced by using the first indication information, so that power consumption of the terminal device is reduced.

For example, the first indication information may indicate whether the narrowband terminal is allowed to select, during cell selection/reselection when a cell with the highest level is barred (or when the cell is considered barred by the narrowband terminal), the cell that has the same frequency as the barred cell. A quantity of cells selected/reselected by the narrowband terminal can be reduced by using the indication information, so that power consumption can be reduced.

In a possible implementation, the first indication information further indicates whether a cell corresponding to the synchronization signal block is a barred cell. In addition to indicating the relative location between the first resource and the second resource, the first indication information may further indicate whether the cell corresponding to the synchronization signal block is the barred cell. The first indication information may be applied to a scenario in which the narrowband terminal is temporarily prevented from accessing a cell during maintenance, and signaling should be notified at an earlier time. In this way, the terminal device can learn as early as possible whether the terminal device is allowed to access the cell corresponding to the synchronization signal block, so as to avoid unnecessary receiving.

In a possible implementation, the first indication information further indicates whether the cell corresponding to the synchronization signal block provides a system information block 1 (SIB1). In addition to indicating the relative location between the first resource and the second resource, the first indication information may further indicate whether the cell corresponding to the synchronization signal block provides the SIB1. When the cell corresponding to the synchronization signal block provides the SIB1, the synchronization signal block may be referred to as a cell defining synchronization broadcast signal block (CD-SBB). When the cell corresponding to the synchronization signal block does not provide the SIB1, the synchronization signal block may be referred to as a non cell defining synchronization broadcast signal block (non CD-SSB). The non CD-SSB is generally used for measurement instead of initial access. If the terminal device determines, in an initial access process by using the first indication, that the synchronization signal block carried in the first resource is the non CD-SSB, the narrowband terminal may not receive the second system message at a frequency corresponding to the synchronization signal block. This reduces power consumption.

In a possible implementation, the first indication information further indicates that a resource multiplexing manner for the first resource and the second resource is TDM or FDM. In addition to indicating the relative location between the first resource and the second resource, the first indication information may further indicate that the first resource and the second resource use the TDM multiplexing manner, or indicate that the first resource and the second resource use the FDM multiplexing manner.

An implementation example in which the network device is a base station is used for description. In step S101, impact of the second system message on energy saving of the base station further needs to be considered during design. Energy saving of the base station means that, when the base station has no service in the system, the base station may shut down symbols other than symbols occupied by a common signal that needs to be sent, such as an SSB, to save energy consumption of the base station. The NR SSB and the second system message are signals that need to be received during initial access, and need to be sent. Therefore, symbols occupied by the NR SSB and the second system message cannot be shut down by the network device. In the TDM manner, a quantity of symbols that cannot be shut down by the network device increases, and consequently an existing energy saving effect of the base station is affected. In the FDM manner, the second system message is aligned with an NR SSB time domain symbol, existing NR time domain symbol shutdown is not affected, and therefore an existing energy saving solution of the base station is not affected.

It can be learned from the foregoing descriptions that the FDM resource multiplexing manner for the first resource and the second resource helps the network device achieve an energy saving effect. However, the TDM resource multiplexing manner for the first resource and the second resource helps the terminal device quickly receive a signal. Both the manners have advantages. The manner of performing indication by using the first indication information can make implementation of the network device more flexible.

In a possible implementation, the first indication information is further used for radio resource management (RRM) measurement. For example, in addition to indicating the relative location between the first resource and the second resource, the first indication information may be further used for RRM measurement, so that the terminal device can improve, based on the first indication information, RRM measurement precision with reference to the synchronization signal block.

In a possible implementation, the first indication information further indicates a radio frame number of the first indication information or N least significant bits of the radio frame number, where N is a positive integer. For example, in addition to indicating the relative location between the first resource and the second resource, the first indication information may further indicate the radio frame number of the first indication information or the N least significant bits of the radio frame number. The terminal device may obtain the radio frame number or the N least significant bits of the radio frame number by using the first indication information. This can reduce descrambling and/or decoding of the second system message, reduce complexity, and further reduce costs of the terminal device.

For example, the first indication information may further indicate the radio frame number or the N least significant bits of the radio frame number, where N is less than 10. Generally, the PBCH carries the seven most significant bits of the radio frame number, and the three least significant bits of the radio frame number are carried by using a scrambling code. Therefore, when obtaining the PBCH, a terminal device with a relatively large operating bandwidth does not learn of the radio frame number, and needs to perform blind detection on different radio frame numbers during descrambling and/or decoding. Consequently, processing complexity of the terminal is increased. If the narrowband terminal obtains the radio frame number or the N least significant bits of the radio frame number by using the first indication information received in step S101, descrambling and/or decoding of the second system message can be reduced, complexity can be reduced, and costs of the narrowband terminal can be further reduced.

In conclusion, in the foregoing communication method, a function of the first indication information includes at least one of the following: indicating the relative resource location of the second resource carrying the second system message and the relative resource location of the first resource carrying the synchronization signal block, indicating whether to send the second system message, indicating whether to listen to the one or more POs located after the SSB corresponding to the first indication information, a system message change indication, intra-frequency reselection indication information, cell barring indication information, indicating whether the SIB1 exists in the SSB corresponding to the first indication information, the resource multiplexing manner for the first resource and the second resource, RRM measurement, and indicating the radio frame number or the N least significant bits of the radio frame number. In addition, a transmission mechanism of the first indication information includes at least the following: The first indication information carries information by using one or more bits, or carries information by using a sequence. In addition, a resource mapping manner of the first indication information includes at least the following: The first indication information may be mapped to one or more symbols after the NR SSB, or the first indication information is mapped to two symbols after every two NR SSBs, where the $1^{st}$ symbol corresponds to the $1^{st}$ NR SSB in the two NR SSBs, and the $2^{nd}$ symbol corresponds to the $2^{nd}$ NR SSB in the two NR SSBs.

It can be learned from the descriptions in FIG. 1 to FIG. 15 that, in the foregoing communication method, the first resource carries the synchronization signal block including the first system message, the second resource carries the second system message, and the bandwidth of the second resource is less than the bandwidth of the first resource. Therefore, when the operating bandwidth of the terminal device is a narrowband, the second system message carried in the second resource with a relatively small bandwidth may be determined by using the first indication information. Compared with a manner in which the network device configures only an initial access signal used for a large bandwidth, this avoids a communication failure and improves communication efficiency because time-frequency synchronization may be performed on a resource with a relatively small bandwidth to implement network communication when the operating bandwidth of the terminal device is a narrow bandwidth.

Figure 16:
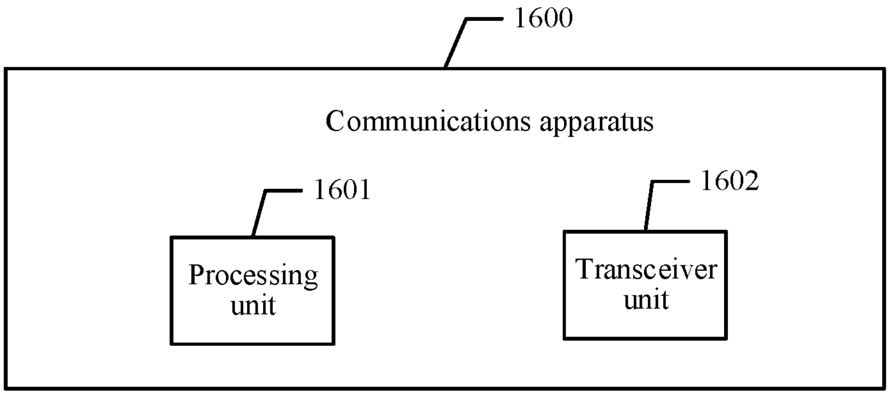
FIG. 16 is a schematic diagram of a communications apparatus according to an embodiment of this application.

Refer to FIG. 16. An embodiment of this application provides a communications apparatus. The communications apparatus 1600 can implement functions of the network device in the foregoing method embodiment, and therefore can also implement beneficial effects of the foregoing method embodiment.

The communications apparatus 1600 includes a processing unit 1601 and a transceiver unit 1602.

The processing unit 1601 is configured to generate first indication information, where the first indication information indicates a relative location between a first resource and a second resource, the first resource carries a synchronization signal block, the synchronization signal block includes a first system message, the second resource carries a second system message, and a bandwidth of the second resource is less than a bandwidth of the first resource.

The transceiver unit 1602 is configured to send the first indication information.

The transceiver unit 1602 is further configured to send the synchronization signal block to a terminal device on the first resource.

The transceiver unit 1602 is further configured to send the second system message to the terminal device on the second resource.

In a possible implementation, the first indication information indicates a relative frequency domain location between the first resource and the second resource.

In a possible implementation, when a signal sequence that carries the first indication information is a first sequence, the first indication information indicates that the first resource is located at a low frequency location of the second resource in frequency domain; and when the signal sequence that carries the first indication information is a second sequence, the first indication information indicates that the first resource is located at a high frequency location of the second resource in frequency domain, where the first sequence is different from the second sequence.

In a possible implementation, in time domain, the second resource is a subset of the first resource; or in time domain, the second resource is a subset of a sum of the first resource and a time domain resource that carries the first indication information.

In a possible implementation, the first indication information indicates a relative time domain location between the first resource and the second resource.

In a possible implementation, in frequency domain, the second resource is a subset of the first resource.

In a possible implementation, in frequency domain, the bandwidth of the second resource is greater than or equal to a bandwidth of a third resource, where the third resource carries a primary synchronization signal or a secondary synchronization signal in the synchronization signal block.

In a possible implementation, the time domain location for carrying the first indication information is located after a time domain location of the first resource, or the time domain location for carrying the first indication information is located before the time domain location of the first resource.

In a possible implementation, the first indication information and the synchronization signal block are located in a same slot.

In a possible implementation, a transmit beam of the first indication information is the same as a transmit beam of the synchronization signal block.

In a possible implementation, the first indication information is carried in DCI, a CRC corresponding to the DCI is scrambled by using a first identifier, and the first identifier is a preset value, or the first identifier is determined based on a cell identity corresponding to the synchronization signal block.

In a possible implementation, the first indication information further indicates that the second system message is sent.

In a possible implementation, the time domain resource occupied by the first indication information is one or more OFDM symbols in a first slot, where the time domain resource occupied by the first indication information is located after a time domain resource occupied by the last synchronization signal block in the first slot; or the time domain resource occupied by the first indication information is located after a time domain resource occupied by the synchronization signal block in the first slot.

In a possible implementation, the first indication information further indicates whether the terminal device listens to one or more POs located after the time domain location of the first indication information.

In a possible implementation, the first indication information further indicates whether a third system message of the terminal device is updated.

In a possible implementation, the first indication information further indicates whether the terminal device is allowed to select, during cell selection/reselection, a cell that has a same frequency as a barred cell.

In a possible implementation, the first indication information further indicates whether a cell corresponding to the synchronization signal block is a barred cell.

In a possible implementation, the first indication information further indicates whether the synchronization signal block includes a SIB1.

In a possible implementation, the first indication information further indicates that a resource multiplexing manner for the first resource and the second resource is TDM or FDM.

In a possible implementation, the first indication information is further used for RRM measurement.

In a possible implementation, the first indication information further indicates a radio frame number of the first indication information or N least significant bits of the radio frame number, where N is a positive integer.

In a possible implementation, the first system message is a first MIB carried on a first PBCH, and the second system message is a second MIB carried on a second PBCH.

In a possible implementation, the first MIB is the same as the second MIB.

In a possible implementation, a first complex symbol obtained after modulation and encoding of the first MIB is mapped to the first resource, a second complex symbol obtained after modulation and encoding of the second MIB is mapped to the second resource, and the second complex symbol is a subset of the first complex symbol.

It should be noted that, for content such as an information execution process of the units in the communications apparatus 1600, refer to the descriptions in the foregoing method embodiment of this application. Details are not described herein again.

Figure 17:
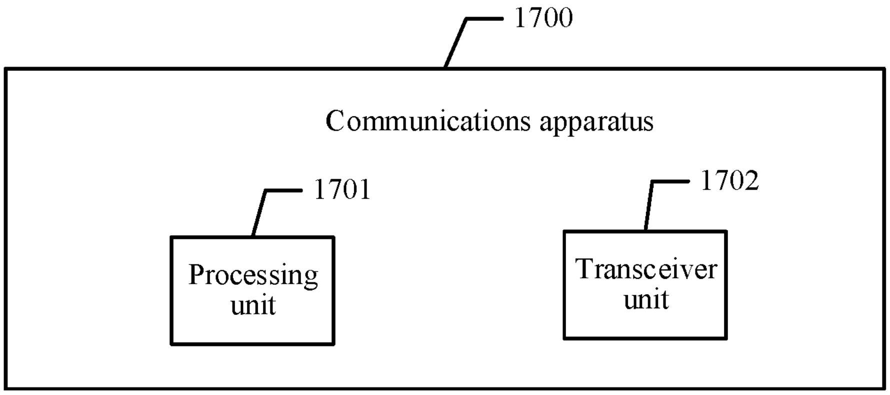
FIG. 17 is a schematic diagram of another communications apparatus according to an embodiment of this application.

Refer to FIG. 17. An embodiment of this application provides a communications apparatus. The communications apparatus 1700 can implement functions of the terminal device in the foregoing method embodiment, and therefore can also implement beneficial effects of the foregoing method embodiment.

The communications apparatus 1700 includes a processing unit 1701 and a transceiver unit 1702.

The transceiver unit 1702 is configured to receive first indication information from a network device, where the first indication information indicates a relative location between a first resource and a second resource, the first resource carries a synchronization signal block, the synchronization signal block includes a first system message, the second resource carries a second system message, and a bandwidth of the second resource is less than a bandwidth of the first resource.

The processing unit 1701 is configured to determine a location of the second resource based on the first indication information.

The transceiver unit 1702 is further configured to receive the second system message from the network device on the second resource.

In a possible implementation, the first indication information indicates a relative frequency domain location between the first resource and the second resource.

In a possible implementation, when a signal sequence that carries the first indication information is a first sequence, the first indication information indicates that the first resource is located at a low frequency location of the second resource in frequency domain; and when the signal sequence that carries the first indication information is a second sequence, the first indication information indicates that the first resource is located at a high frequency location of the second resource in frequency domain, where the first sequence is different from the second sequence.

In a possible implementation, in time domain, the second resource is a subset of the first resource; or in time domain, the second resource is a subset of a sum of the first resource and a time domain resource that carries the first indication information.

In a possible implementation, the first indication information indicates a relative time domain location between the first resource and the second resource.

In a possible implementation, in frequency domain, the second resource is a subset of the first resource.

In a possible implementation, in frequency domain, the bandwidth of the second resource is greater than or equal to a bandwidth of a third resource, where the third resource carries a primary synchronization signal or a secondary synchronization signal in the synchronization signal block.

In a possible implementation, the time domain location for carrying the first indication information is located after a time domain location of the first resource, or the time domain location for carrying the first indication information is located before the time domain location of the first resource.

In a possible implementation, the first indication information and the synchronization signal block are located in a same slot.

In a possible implementation, the transceiver unit 1702 is further configured to receive a first part of the synchronization signal block; and the processing unit 1701 is further configured to determine, based on the first part of the synchronization signal block, a time domain location for carrying the first indication information.

In a possible implementation, the first indication information is carried in DCI, a CRC corresponding to the DCI is scrambled by using a first identifier, and the first identifier is a preset value, or the first identifier is determined based on a cell identity corresponding to the synchronization signal block.

In a possible implementation, the first indication information further indicates that the second system message is sent.

In a possible implementation, the time domain resource occupied by the first indication information is one or more OFDM symbols in a first slot, where the time domain resource occupied by the first indication information is located after a time domain resource occupied by the last synchronization signal block in the first slot; or the time domain resource occupied by the first indication information is located after a time domain resource occupied by the synchronization signal block in the first slot.

In a possible implementation, the first indication information further indicates whether the terminal device listens to one or more POs located after the time domain location of the first indication information.

In a possible implementation, the first indication information further indicates whether a third system message of the terminal device is updated.

In a possible implementation, the first indication information further indicates whether the terminal device is allowed to select, during cell selection/reselection, a cell that has a same frequency as a barred cell.

In a possible implementation, the first indication information further indicates whether a cell corresponding to the synchronization signal block is a barred cell.

In a possible implementation, the first indication information further indicates whether the synchronization signal block includes a SIB1.

In a possible implementation, the first indication information further indicates that a resource multiplexing manner for the first resource and the second resource is TDM or FDM.

In a possible implementation, the first indication information is further used for RRM measurement.

In a possible implementation, the first indication information further indicates a radio frame number of the first indication information or N least significant bits of the radio frame number, where N is a positive integer.

In a possible implementation, the first system message is a first MIB carried on a first PBCH, and the second system message is a second MIB carried on a second PBCH.

In a possible implementation, the first MIB is the same as the second MIB.

In a possible implementation, a first complex symbol obtained after modulation and encoding of the first MIB is mapped to the first resource, a second complex symbol obtained after modulation and encoding of the second MIB is mapped to the second resource, and the second complex symbol is a subset of the first complex symbol.

It should be noted that, for content such as an information execution process of the units in the communications apparatus 1700, refer to the descriptions in the foregoing method embodiment of this application. Details are not described herein again.

Figure 18:
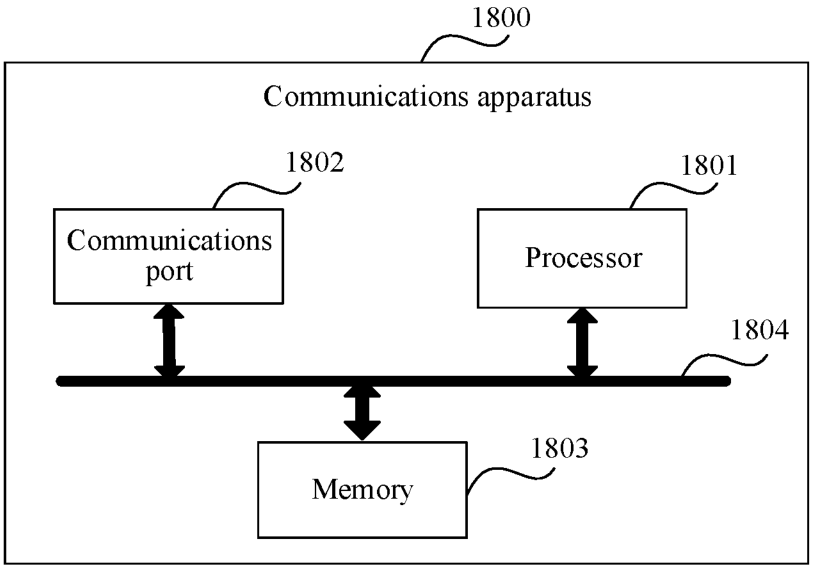
FIG. 18 is a schematic diagram of another communications apparatus according to an embodiment of this application.

FIG. 18 is a schematic diagram of a possible logical structure of the communications apparatus 1800 in the foregoing embodiment according to an embodiment of this application. The communications apparatus may be the terminal device in the foregoing embodiments. The communications apparatus 1800 may include but is not limited to at least one processor 1801 and a communications port 1802. Optionally, the apparatus may further include at least one of a memory 1803 and a bus 1804. In this embodiment of this application, the at least one processor 1801 is configured to control an action of the communications apparatus 1800.

In addition, the processor 1801 may be a central processing unit, a general purpose processor, a digital signal processor, an application-specific integrated circuit, a field programmable gate array or another programmable logic device, a transistor logic device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of a digital signal processor and a microprocessor. It may be clearly understood by a person skilled in the art that, for the purpose of convenient and brief description, for a detailed working process of the foregoing system, apparatus, and unit, refer to a corresponding process in the foregoing method embodiment. Details are not described herein again.

The processor 1801 may perform at least the following process:

receiving first indication information from a network device, where the first indication information indicates a relative location between a first resource and a second resource, the first resource carries a synchronization signal block, the synchronization signal block includes a first system message, the second resource carries a second system message, and a bandwidth of the second resource is less than a bandwidth of the first resource;

determining a location of the second resource based on the first indication information; and receiving the second system message from the network device on the second resource.

In a possible implementation, the processor 1801 is further configured to:

receive a first part of the synchronization signal block; and determine, based on the first part of the synchronization signal block, a time domain location for carrying the first indication information.

In a possible implementation, the first indication information indicates a relative frequency domain location between the first resource and the second resource.

In a possible implementation, when a signal sequence that carries the first indication information is a first sequence, the first indication information indicates that the first resource is located at a low frequency location of the second resource in frequency domain; and when the signal sequence that carries the first indication information is a second sequence, the first indication information indicates that the first resource is located at a high frequency location of the second resource in frequency domain, where the first sequence is different from the second sequence.

In a possible implementation, in time domain, the second resource is a subset of the first resource; or in time domain, the second resource is a subset of a sum of the first resource and a time domain resource that carries the first indication information.

In a possible implementation, the first indication information indicates a relative time domain location between the first resource and the second resource.

In a possible implementation, in frequency domain, the second resource is a subset of the first resource.

In a possible implementation, in frequency domain, the bandwidth of the second resource is greater than or equal to a bandwidth of a third resource, where the third resource carries a primary synchronization signal or a secondary synchronization signal in the synchronization signal block.

In a possible implementation, the time domain location for carrying the first indication information is located after a time domain location of the first resource, or the time domain location for carrying the first indication information is located before the time domain location of the first resource.

In a possible implementation, the first indication information and the synchronization signal block are located in a same slot.

In a possible implementation, a transmit beam of the first indication information is the same as a transmit beam of the synchronization signal block.

In a possible implementation, the first indication information is carried in DCI, a CRC corresponding to the DCI is scrambled by using a first identifier, and the first identifier is a preset value, or the first identifier is determined based on a cell identity corresponding to the synchronization signal block.

In a possible implementation, the first indication information further indicates that the second system message is sent.

In a possible implementation, the time domain resource occupied by the first indication information is one or more OFDM symbols in a first slot, where the time domain resource occupied by the first indication information is located after a time domain resource occupied by the last synchronization signal block in the first slot; or the time domain resource occupied by the first indication information is located after a time domain resource occupied by the synchronization signal block in the first slot.

In a possible implementation, the first indication information further indicates whether the terminal device listens to one or more POs located after the time domain location of the first indication information.

In a possible implementation, the first indication information further indicates whether a third system message of the terminal device is updated.

In a possible implementation, the first indication information further indicates whether the terminal device is allowed to select, during cell selection/reselection, a cell that has a same frequency as a barred cell.

In a possible implementation, the first indication information further indicates whether a cell corresponding to the synchronization signal block is a barred cell.

In a possible implementation, the first indication information further indicates whether the synchronization signal block includes a SIB1.

In a possible implementation, the first indication information further indicates that a resource multiplexing manner for the first resource and the second resource is TDM or FDM.

In a possible implementation, the first indication information is further used for RRM measurement.

In a possible implementation, the first indication information further indicates a radio frame number of the first indication information or N least significant bits of the radio frame number, where N is a positive integer.

In a possible implementation, the first system message is a first MIB carried on a first PBCH, and the second system message is a second MIB carried on a second PBCH.

In a possible implementation, the first MIB is the same as the second MIB.

In a possible implementation, a first complex symbol obtained after modulation and encoding of the first MIB is mapped to the first resource, a second complex symbol obtained after modulation and encoding of the second MIB is mapped to the second resource, and the second complex symbol is a subset of the first complex symbol.

It should be noted that the communications apparatus shown in FIG. 18 may be configured to implement other steps implemented by the terminal device in the foregoing corresponding method embodiment, and implement technical effects corresponding to the terminal device. For implementations of the communications apparatus shown in FIG. 18, refer to descriptions in the foregoing method embodiment. Details are not described herein again.

Figure 19:
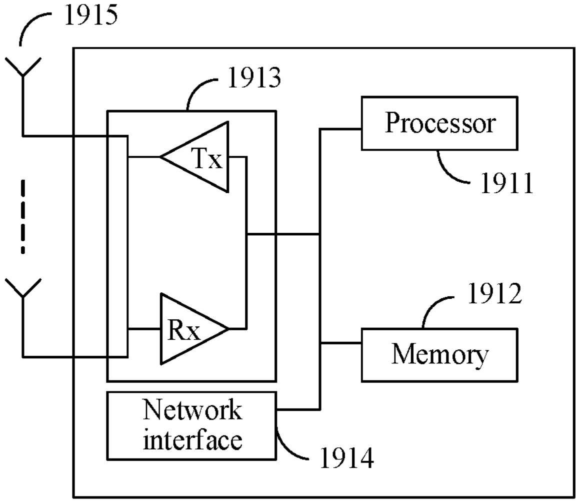
FIG. 19 is a schematic diagram of another communications apparatus according to an embodiment of this application.

FIG. 19 is a schematic diagram of a structure of the communications apparatus in the foregoing embodiment according to an embodiment of this application. The communications apparatus may be the network device in the foregoing embodiment. For a structure of the communications apparatus, refer to the structure shown in FIG. 19.

The communications apparatus includes at least one processor 1911 and at least one network interface 1914. Optionally, the communications apparatus further includes at least one memory 1912, at least one transceiver 1913, and one or more antennas 1915. The processor 1911, the memory 1912, the transceiver 1913, and the network interface 1914 are connected, for example, through a bus. In this embodiment of this application, the connection may include various interfaces, transmission lines, buses, or the like. This is not limited in this embodiment. The antenna 1915 is connected to the transceiver 1913. The network interface 1914 is configured to enable the communications apparatus to communicate with another communications device through a communications link. For example, the network interface 1914 may include a network interface between the communications apparatus and a core network device, for example, an S1 interface. The network interface may include a network interface between the communications apparatus and another communications apparatus (for example, another network device or the core network device), for example, an X2 or Xn interface.

The processor 1911 is mainly configured to process a communication protocol and communication data, control the entire communications apparatus, execute a software program, and process data of the software program. For example, the processor 1911 is configured to support the communications apparatus in performing actions described in the embodiments. The communications apparatus may include a baseband processor and a central processing unit. The baseband processor is mainly configured to process a communication protocol and communication data. The central processing unit is mainly configured to control the entire terminal device, execute software program, and process data of the software program. Functions of the baseband processor and the central processing unit may be integrated into the processor 1911 in FIG. 19. A person skilled in the art may understand that the baseband processor and the central processing unit may alternatively be processors independent of each other, and are interconnected by using a technology such as a bus. A person skilled in the art may understand that the terminal device may include a plurality of baseband processors to adapt to different network standards, the terminal device may include a plurality of central processing units to enhance a processing capability of the terminal device, and components of the terminal device may be connected through various buses. The baseband processor may alternatively be expressed as a baseband processing circuit or a baseband processing chip. The central processing unit may alternatively be expressed as a central processing circuit or a central processing chip. The function of processing the communication protocol and the communication data may be built in the processor, or may be stored in the memory in a form of a software program, and the processor executes the software program to implement a baseband processing function.

The memory is mainly configured to store a software program and data. The memory 1912 may exist independently, and is connected to the processor 1911. Optionally, the memory 1912 may be integrated with the processor 1911, for example, integrated into a chip. The memory 1912 may store program code for executing the technical solutions in embodiments of this application, and the processor 1911 controls execution of the program code. Various types of computer program code that are executed may also be considered as drivers of the processor 1911.

FIG. 19 shows only one memory and one processor. In an actual terminal device, there may be a plurality of processors and a plurality of memories. The memory may also be referred to as a storage medium, a storage device, or the like. The memory may be a storage element located on a same chip as the processor, namely, an on-chip storage element, or may be an independent storage element. This is not limited in this embodiment of this application.

The transceiver 1913 may be configured to support receiving or sending of a radio frequency signal between the communications apparatus and a terminal, and the transceiver 1913 may be connected to the antenna 1915. The transceiver 1913 includes a transmitter Tx and a receiver Rx. The one or more antennas 1915 may receive a radio frequency signal. The receiver Rx of the transceiver 1913 is configured to receive the radio frequency signal from the antenna, convert the radio frequency signal into a digital baseband signal or a digital intermediate frequency signal, and provide the digital baseband signal or the digital intermediate frequency signal for the processor 1911, so that the processor 1911 performs further processing on the digital baseband signal or the digital intermediate frequency signal, for example, performs demodulation processing and decoding processing. In addition, the transmitter Tx of the transceiver 1913 is further configured to receive a modulated digital baseband signal or digital intermediate frequency signal from the processor 1911, convert the modulated digital baseband signal or digital intermediate frequency signal into a radio frequency signal, and send the radio frequency signal through the one or more antennas 1915. The receiver Rx may selectively perform one or more levels of frequency down-mixing processing and analog-to-digital conversion processing on the radio frequency signal to obtain the digital baseband signal or the digital intermediate frequency signal. A sequence of the frequency down-mixing processing and the analog-to-digital conversion processing is adjustable. The transmitter Tx may selectively perform one or more levels of frequency up-mixing processing and digital-to-analog conversion processing on the modulated digital baseband signal or digital intermediate frequency signal to obtain the radio frequency signal. A sequence of the frequency up-mixing processing and the digital-to-analog conversion processing is adjustable. The digital baseband signal and the digital intermediate frequency signal may be collectively referred to as a digital signal.

The transceiver may also be referred to as a transceiver unit, a transceiver, a transceiver apparatus, or the like. Optionally, a component that is configured to implement a receiving function and that is in the transceiver unit may be considered as a receiving unit, and a component that is configured to implement a sending function and that is in the transceiver unit may be considered as a sending unit. In other words, the transceiver unit includes the receiving unit and the sending unit. The receiving unit may also be referred to as a receiver, an input port, a receiving circuit, or the like. The sending unit may be referred to as a transmitter, a transmitting circuit, or the like.

The processor 1911 may perform at least the following process:

generating first indication information, where the first indication information indicates a relative location between a first resource and a second resource, the first resource carries a synchronization signal block, the synchronization signal block includes a first system message, the second resource carries a second system message, and a bandwidth of the second resource is less than a bandwidth of the first resource;

sending the first indication information;

sending the synchronization signal block to a terminal device on the first resource; and sending the second system message to the terminal device on the second resource.

In a possible implementation, the first indication information indicates a relative frequency domain location between the first resource and the second resource.

In a possible implementation, when a signal sequence that carries the first indication information is a first sequence, the first indication information indicates that the first resource is located at a low frequency location of the second resource in frequency domain; and when the signal sequence that carries the first indication information is a second sequence, the first indication information indicates that the first resource is located at a high frequency location of the second resource in frequency domain, where the first sequence is different from the second sequence.

In a possible implementation, in time domain, the second resource is a subset of the first resource; or in time domain, the second resource is a subset of a sum of the first resource and a time domain resource that carries the first indication information.

In a possible implementation, the first indication information indicates a relative time domain location between the first resource and the second resource.

In a possible implementation, in frequency domain, the second resource is a subset of the first resource.

In a possible implementation, in frequency domain, the bandwidth of the second resource is greater than or equal to a bandwidth of a third resource, where the third resource carries a primary synchronization signal or a secondary synchronization signal in the synchronization signal block.

In a possible implementation, the time domain location for carrying the first indication information is located after a time domain location of the first resource, or the time domain location for carrying the first indication information is located before the time domain location of the first resource.

In a possible implementation, the first indication information and the synchronization signal block are located in a same slot.

In a possible implementation, the first indication information is carried in DCI, a CRC corresponding to the DCI is scrambled by using a first identifier, and the first identifier is a preset value, or the first identifier is determined based on a cell identity corresponding to the synchronization signal block.

In a possible implementation, the first indication information further indicates that the second system message is sent.

In a possible implementation, the time domain resource occupied by the first indication information is one or more OFDM symbols in a first slot, where the time domain resource occupied by the first indication information is located after a time domain resource occupied by the last synchronization signal block in the first slot; or the time domain resource occupied by the first indication information is located after a time domain resource occupied by the synchronization signal block in the first slot.

In a possible implementation, the first indication information further indicates whether the terminal device listens to one or more POs located after the time domain location of the first indication information.

In a possible implementation, the first indication information further indicates whether a third system message of the terminal device is updated.

In a possible implementation, the first indication information further indicates whether the terminal device is allowed to select, during cell selection/reselection, a cell that has a same frequency as a barred cell.

In a possible implementation, the first indication information further indicates whether a cell corresponding to the synchronization signal block is a barred cell.

In a possible implementation, the first indication information further indicates whether the synchronization signal block includes a SIB1.

In a possible implementation, the first indication information further indicates that a resource multiplexing manner for the first resource and the second resource is TDM or FDM.

In a possible implementation, the first indication information is further used for RRM measurement.

In a possible implementation, the first indication information further indicates a radio frame number of the first indication information or N least significant bits of the radio frame number, where N is a positive integer.

In a possible implementation, the first system message is a first MIB carried on a first PBCH, and the second system message is a second MIB carried on a second PBCH.

In a possible implementation, the first MIB is the same as the second MIB.

In a possible implementation, a first complex symbol obtained after modulation and encoding of the first MIB is mapped to the first resource, a second complex symbol obtained after modulation and encoding of the second MIB is mapped to the second resource, and the second complex symbol is a subset of the first complex symbol.

It should be noted that the communications apparatus shown in FIG. 19 may be configured to implement steps implemented by the network device in the foregoing method embodiment, and implement technical effects corresponding to the network device. For implementations of the communications apparatus shown in FIG. 19, refer to descriptions in the foregoing method embodiment. Details are not described herein again.

An embodiment of this application further provides a computer-readable storage medium storing one or more computer-executable instructions. When the computer-executable instructions are executed by a processor, the processor performs the method according to the possible implementations of the communications apparatus (implemented as the terminal device) in the foregoing embodiment.

An embodiment of this application further provides a computer-readable storage medium storing one or more computer-executable instructions. When the computer-executable instructions are executed by a processor, the processor performs the method according to the possible implementations of the communications apparatus (implemented as the network device) in the foregoing embodiment.

An embodiment of this application further provides a computer program product (or referred to as a computer program) storing one or more computers. When the computer program product is executed by a processor, the processor performs the method according to the possible implementations of the communications apparatus (implemented as the terminal device).

An embodiment of this application further provides a computer program product storing one or more computers. When the computer program product is executed by a processor, the processor performs the method according to the possible implementations of the communications apparatus (implemented as the network device).

An embodiment of this application further provides a chip system. The chip system includes at least one processor, configured to support a terminal device in implementing functions in the possible implementations of the communications apparatus (implemented as the terminal device). Optionally, the chip system further includes an interface circuit, and the interface circuit provides program instructions and/or data for the at least one processor. In a possible design, the chip system may further include a memory. The memory is configured to store program instructions and data that are for the terminal device. The chip system may include a chip, or may include a chip and another discrete component.

An embodiment of this application further provides a chip system. The chip system includes at least one processor, configured to support a network device in implementing functions in the possible implementations of the communications apparatus (implemented as the network device). Optionally, the chip system further includes an interface circuit, and the interface circuit provides program instructions and/or data for the at least one processor. In a possible design, the chip system may further include a memory. The memory is configured to store program instructions and data that are for the network device. The chip system may include a chip, or may include a chip and another discrete component. The network device may be the network device in the foregoing method embodiment.

An embodiment of this application further provides a communications system. The network system architecture includes the communications apparatuses (including the terminal device and the network device) in any one of the foregoing embodiments.

In several embodiments provided in this application, it should be understood that the disclosed system, apparatus, and method may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may be or may not be physically separate, and parts displayed as units may be or may not be physical units, that is, may be located in one place, or may be distributed on a plurality of network units. Some or all of the units may be selected according to actual requirements to achieve the objectives of the solutions of embodiments.

In addition, functional units in embodiments of this application may be integrated into one processing unit, each of the units may exist alone physically, or two or more units are integrated into one unit. The integrated unit may be implemented in a form of hardware, or may be implemented in a form of a software functional unit. When the integrated unit is implemented in the form of a software functional unit and sold or used as an independent product, the unit may be stored in a computer-readable storage medium. Based on such an understanding, the technical solutions of this application essentially, or the part contributing to the conventional technology, or some or all of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely some implementations of embodiments of this application, but are not intended to limit the protection scope of embodiments of this application. Any variation or replacement readily figured out by a person skilled in the art within the technical scope disclosed in embodiments of this application shall fall within the protection scope of embodiments of this application. Therefore, the protection scope of embodiments of this application shall be subject to the protection scope of the claims.

What is claimed is:

1. A device, comprising:

a processor; and a non-transitory computer-readable storage medium storing a program to be executed by the processor, which when executed causes the device to:

receive first indication information from a network device, wherein the first indication information indicates a relative location between a first resource and a second resource, the first resource is a resource carrying a synchronization signal block, the synchronization signal block comprises a first system message, the second resource is a resource carrying a second system message, and a bandwidth of the second resource is less than a bandwidth of the first resource; and receive a second system message from the network device on the second resource, wherein a location of the second resource is determined based on the first indication information.

2. The device according to claim 1, wherein the program when executed further causes the device to:

receive a first part of the synchronization signal block; and determine based on the first part of the synchronization signal block, a time domain location for carrying the first indication information.

3. The device according to claim 2, wherein the time domain location for carrying the first indication information is located after a time domain location of the first resource.

4. The device according to claim 1, wherein the first indication information indicates a relative frequency domain location between the first resource and the second resource.

5. The device according to claim 4, wherein when a signal sequence that carries the first indication information is a first sequence, the first indication information indicates that the first resource is located at a low frequency location of the second resource in a frequency domain; or when the signal sequence that carries the first indication information is a second sequence, the first indication information indicates that the first resource is located at a high frequency location of the second resource in the frequency domain, wherein the first sequence is different from the second sequence.

6. The device according to claim 4, wherein
in a time domain, the second resource is a subset of the first resource.

7. The device according to claim 1, wherein
the relative location between the first resource and the second resource is a relative time domain location.

8. The device according to claim 7, wherein
in a frequency domain, the second resource is a subset of the first resource.

9. The device according to claim 7, wherein
in a frequency domain, the bandwidth of the second resource is greater than or equal to a bandwidth of a third resource, wherein the third resource carries a primary synchronization signal or a secondary synchronization signal in the synchronization signal block.

10. The device according to claim 1, wherein
the first indication information and the synchronization signal block are located in a same slot.

11. A device, comprising:
a processor; and
a non-transitory computer-readable storage medium storing a program to be executed by the processor, which when executed causes the device to:
send first indication information that indicates a relative location between a first resource and a second resource, wherein the first resource carries a synchronization signal block comprises a first system message, the second resource carries a second system message, and a bandwidth of the second resource is less than a bandwidth of the first resource;
send the synchronization signal block on the first resource; and
send the second system message on the second resource.

12. The device according to claim 11, wherein
the first indication information indicates a relative frequency domain location between the first resource and the second resource.

13. The device according to claim 12, wherein
when a signal sequence that carries the first indication information is a first sequence, the first indication information indicates that the first resource is located at a low frequency location of the second resource in a frequency domain; or
when the signal sequence that carries the first indication information is a second sequence, the first indication information indicates that the first resource is located at a high frequency location of the second resource in the frequency domain, wherein the first sequence is different from the second sequence.

14. The device according to claim 12, wherein
in a time domain, the second resource is a subset of the first resource.

15. The device according to claim 11, wherein
the relative location between the first resource and the second resource is a relative time domain location.

16. The device according to claim 15, wherein
in a frequency domain, the second resource is a subset of the first resource.

17. The device according to claim 15, wherein
in a frequency domain, the bandwidth of the second resource is greater than or equal to a bandwidth of a third resource, wherein the third resource carries a primary synchronization signal or a secondary synchronization signal in the synchronization signal block.

18. The device according to claim 11, wherein
the first indication information and the synchronization signal block are located in a same slot.

19. The device according to claim 11, wherein
a transmit beam of the first indication information is the same as a transmit beam of the synchronization signal block.

20. A method comprising:
sending first indication information that indicates a relative location between a first resource and a second resource, wherein the first resource carries a synchronization signal block comprises a first system message, the second resource carries a second system message, and a bandwidth of the second resource is less than a bandwidth of the first resource;
sending the synchronization signal block on the first resource; and
sending the second system message on the second resource.

* * * * *